(12) United States Patent
Holalakere Sreenivasa Rao

(10) Patent No.: US 11,559,089 B1
(45) Date of Patent: Jan. 24, 2023

(54) MEDICAL GOWN, PACKAGING OF SAME, AND METHODS FOR EXPEDITED DONNING

(71) Applicant: Anoop Kumar Holalakere Sreenivasa Rao, Albuquerque, NM (US)

(72) Inventor: Anoop Kumar Holalakere Sreenivasa Rao, Albuquerque, NM (US)

(73) Assignee: Expedonn LLC, Albuquerque, NM (US)

( * ) Notice: Subject to any disclaimer, the term of this patent is extended or adjusted under 35 U.S.C. 154(b) by 0 days.

(21) Appl. No.: 17/697,819

(22) Filed: Mar. 17, 2022

Related U.S. Application Data

(62) Division of application No. 17/548,024, filed on Dec. 10, 2021.

(60) Provisional application No. 63/227,440, filed on Jul. 30, 2021.

(51) Int. Cl.
A41D 13/12 (2006.01)

(52) U.S. Cl.
CPC ........ A41D 13/129 (2013.01); *A41D 2300/32* (2013.01); *A41D 2300/33* (2013.01)

(58) Field of Classification Search
CPC .............. A41D 13/129; A41D 13/1209; A41D 2300/33; A47G 25/90
See application file for complete search history.

(56) References Cited

U.S. PATENT DOCUMENTS

| | | | | |
|---|---|---|---|---|
| 895,510 A | * | 8/1908 | Snellenburg | A41D 13/129 2/114 |
| 1,989,309 A | * | 1/1935 | Fowler | A41D 27/12 2/46 |
| 2,490,477 A | * | 12/1949 | Runck | A41D 13/04 2/52 |
| 3,218,649 A | * | 11/1965 | Ricter | A41D 13/1209 2/48 |
| 3,230,546 A | * | 1/1966 | Sabee | A41D 13/1209 2/114 |
| 3,311,112 A | * | 3/1967 | Murray | A41F 1/006 450/82 |
| 3,359,569 A | * | 12/1967 | Scrivens | A41D 13/1209 206/440 |
| 3,721,999 A | * | 3/1973 | Goya | A41D 13/1209 206/278 |
| 4,000,521 A | * | 1/1977 | Zoephel | A41D 13/1209 2/114 |
| 4,214,320 A | * | 7/1980 | Belkin | A41D 13/1209 2/114 |
| 4,215,434 A | * | 8/1980 | Barron | A41D 13/1236 2/114 |
| 4,255,818 A | * | 3/1981 | Crowley | A41D 13/1209 2/114 |

(Continued)

*Primary Examiner* — Alissa L Hoey
(74) *Attorney, Agent, or Firm* — Dorsey & Whitney LLP

(57) ABSTRACT

A medical gown includes a main body having a neck edge, a first side edge, and a second side edge. The first side edge may extend from the neck edge. The second side edge may extend from the neck edge, opposite the first side edge. The neck edge may define a neck engagement feature between the first and second side edges. The medical gown may further include a first strap feature coupled with the main body and defining a first loop with the first side edge. The medical gown may further include a second strap feature coupled with the main body and defining a second loop with the second side edge.

11 Claims, 19 Drawing Sheets

(56) References Cited

U.S. PATENT DOCUMENTS

| | | | | |
|---|---|---|---|---|
| 4,384,370 A * | 5/1983 | Singer | A41D 13/1209 | 2/114 |
| 4,558,468 A * | 12/1985 | Landry | A41D 13/1209 | 2/114 |
| 4,674,132 A * | 6/1987 | Stein | A41D 13/1209 | 2/114 |
| 5,142,704 A * | 9/1992 | Viemeister | A42B 1/046 | 2/202 |
| 5,154,691 A * | 10/1992 | Box | A61F 5/01 | 602/5 |
| 5,414,867 A * | 5/1995 | Bowling | A41D 13/1209 | 2/46 |
| 5,836,310 A * | 11/1998 | Winters | A61F 5/3784 | 128/845 |
| 5,862,525 A * | 1/1999 | Tankersley | D06F 89/02 | 2/243.1 |
| 5,867,825 A * | 2/1999 | Scheerer | A41D 13/1218 | 206/278 |
| 6,421,833 B2 * | 7/2002 | Khanamirian | A41D 13/0007 | 2/69 |
| 7,546,643 B1 * | 6/2009 | De La Rotta | A41D 13/1209 | 2/114 |
| 7,549,179 B1 * | 6/2009 | Saied | A41D 13/0012 | 2/114 |
| D604,477 S * | 11/2009 | Stafstrom | D2/720 | |
| 8,067,759 B1 * | 11/2011 | Swartz | G21F 3/02 | 2/92 |
| 8,146,175 B2 * | 4/2012 | Otenbaker | A41F 15/00 | 450/30 |
| 8,332,965 B1 * | 12/2012 | Ryer | A41D 13/1236 | 2/72 |
| 8,550,314 B2 * | 10/2013 | Kelly | A61B 42/00 | 223/111 |
| 8,608,022 B1 * | 12/2013 | Kory | A47G 25/90 | 221/33 |
| 8,960,493 B1 * | 2/2015 | Dennison | A61B 42/50 | 221/33 |
| 9,687,032 B2 * | 6/2017 | McBride | A41D 13/1209 | |
| 9,861,537 B2 * | 1/2018 | Louwrens | A41D 13/12 | |
| 10,034,566 B1 * | 7/2018 | Shin | A61B 50/30 | |
| 10,231,496 B1 * | 3/2019 | Glassner | A41D 1/06 | |
| 10,292,517 B1 * | 5/2019 | Lawver | A41F 3/02 | |
| 10,334,895 B1 * | 7/2019 | Levine | A41D 13/129 | |
| 11,116,263 B2 * | 9/2021 | Czajka | A41D 13/12 | |
| 2003/0003844 A1 * | 1/2003 | Jones | A41F 15/002 | 450/88 |
| 2006/0049199 A1 * | 3/2006 | West | A61B 42/40 | 221/26 |
| 2009/0165186 A1 * | 7/2009 | Mijares | A41D 13/1236 | 2/114 |
| 2010/0064414 A1 * | 3/2010 | Kemper | A41F 9/007 | 2/243.1 |
| 2012/0280004 A1 * | 11/2012 | Huang | A47G 25/90 | 223/85 |
| 2013/0036526 A1 * | 2/2013 | Rashman | A41D 13/1245 | 2/114 |
| 2013/0105511 A1 * | 5/2013 | Graneto, III | B65D 83/0805 | 493/405 |
| 2013/0318682 A1 * | 12/2013 | Graneto, III | A41D 13/1209 | 2/114 |
| 2013/0318693 A1 * | 12/2013 | McBride | A41D 13/129 | 2/456 |
| 2015/0135397 A1 * | 5/2015 | Levine | A41D 13/1236 | 2/114 |
| 2015/0157064 A1 * | 6/2015 | Inoue | A41D 3/00 | 2/74 |
| 2016/0058078 A1 * | 3/2016 | Monir | A47G 25/90 | 248/317 |
| 2017/0265537 A1 * | 9/2017 | Audet | A41D 31/12 | |
| 2018/0192713 A1 * | 7/2018 | Genender | A41D 13/12 | |
| 2018/0228227 A1 * | 8/2018 | Dieu | A41D 13/1209 | |
| 2018/0343940 A1 * | 12/2018 | Genender | A41D 13/1236 | |
| 2018/0368501 A1 * | 12/2018 | Freeman | A41D 1/02 | |
| 2019/0343198 A1 * | 11/2019 | Palomo | A41D 13/129 | |
| 2021/0077321 A1 * | 3/2021 | Louwrens | A41D 13/12 | |
| 2021/0169158 A1 * | 6/2021 | Mithani | A41D 13/129 | |
| 2022/0047018 A1 * | 2/2022 | Koos | A41D 13/0562 | |
| 2022/0105370 A1 * | 4/2022 | Tabbara | A62B 23/00 | |

* cited by examiner

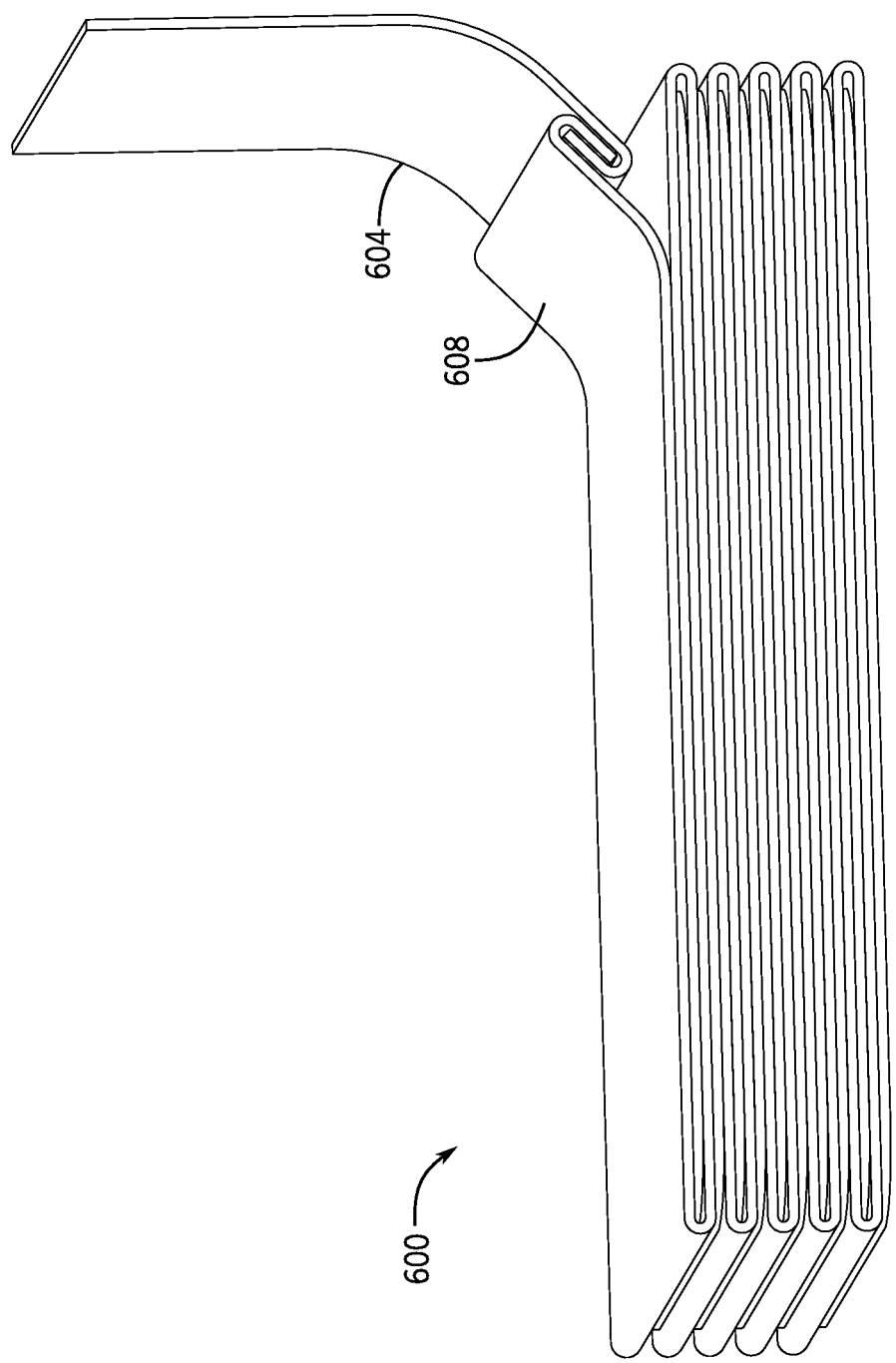

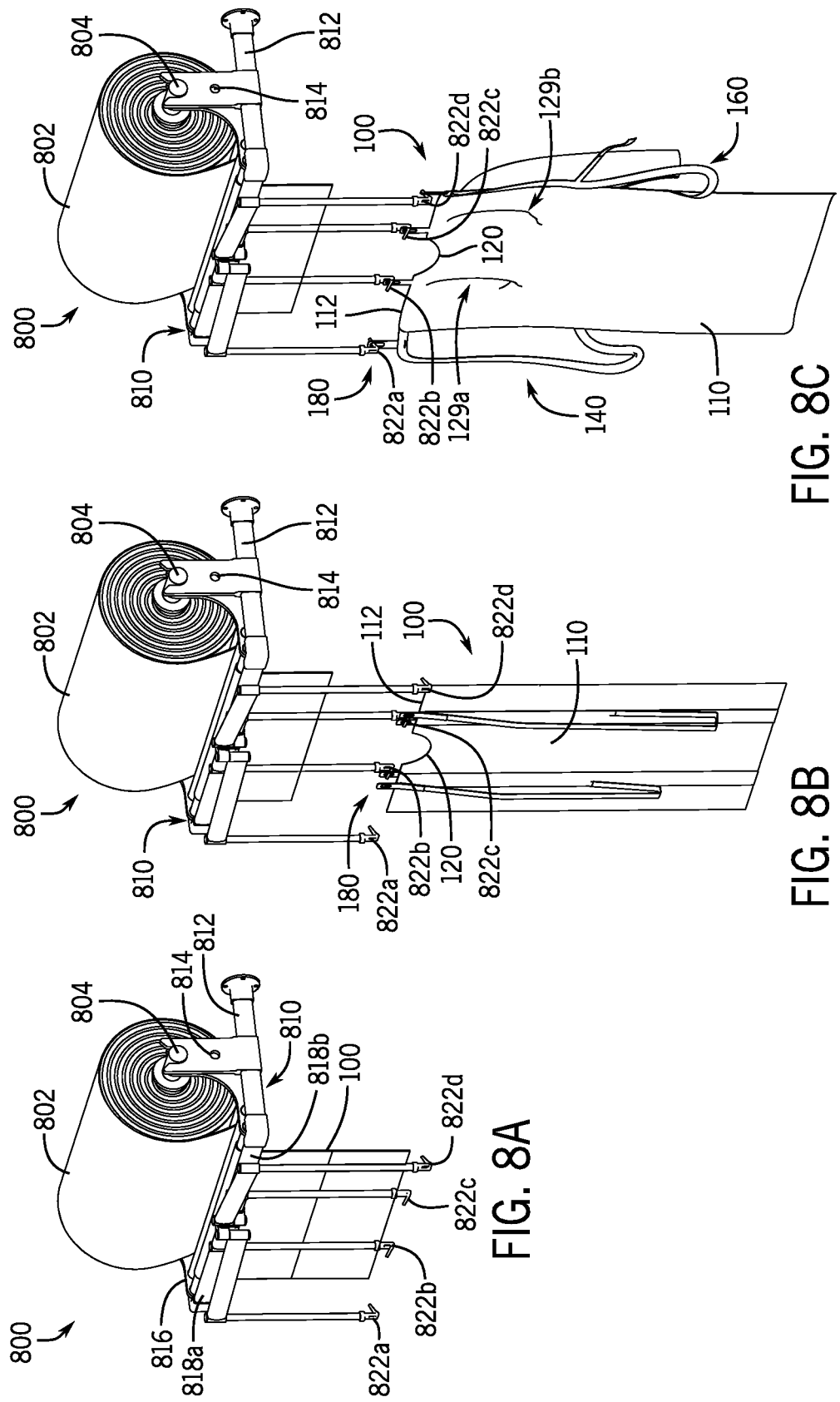

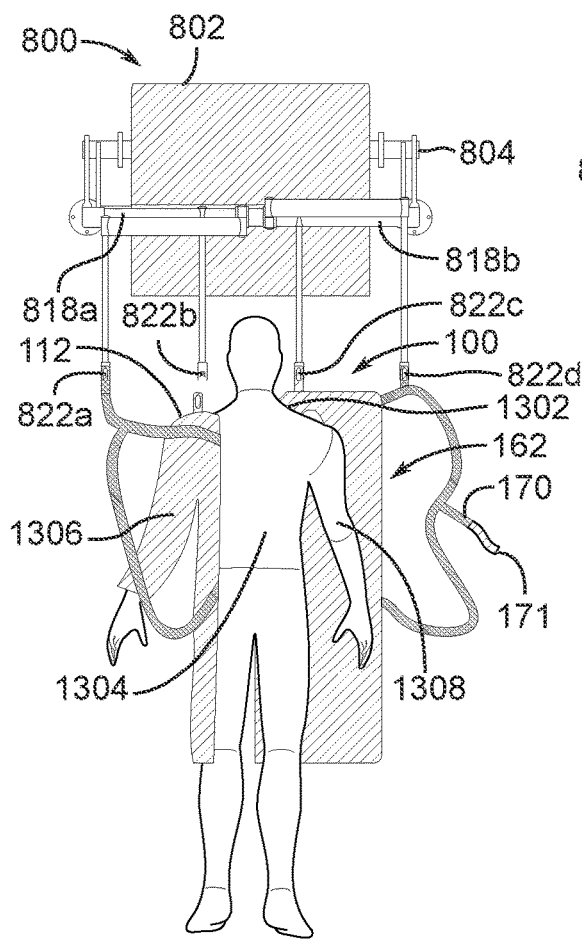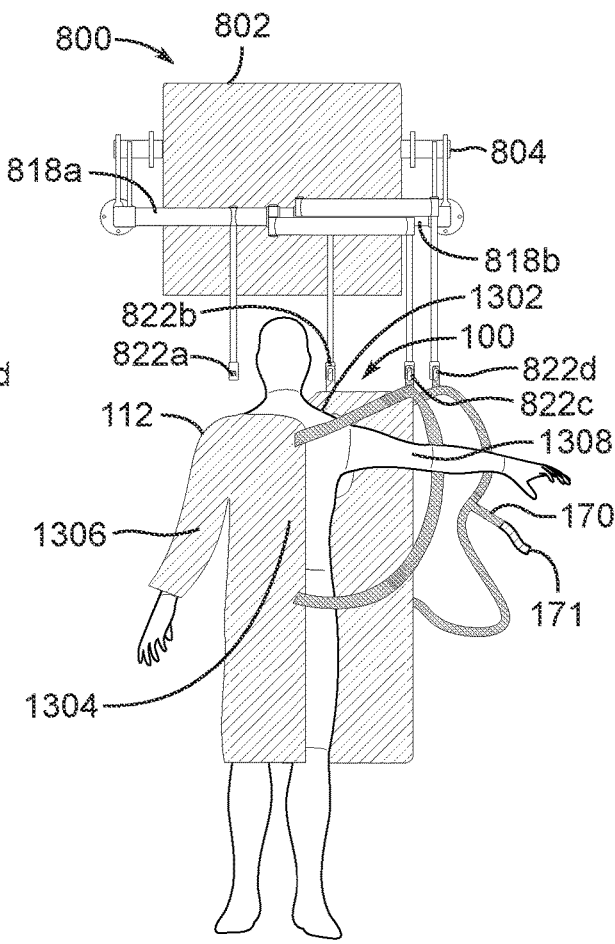
FIG. 15A
FIG. 16A
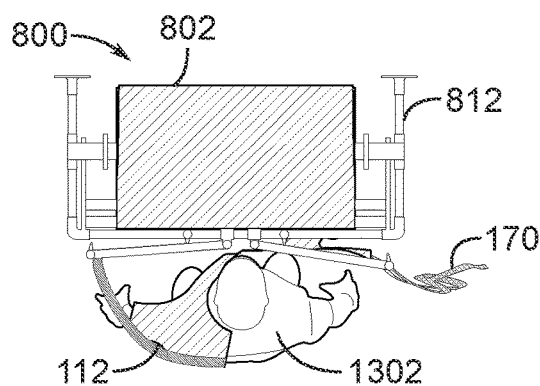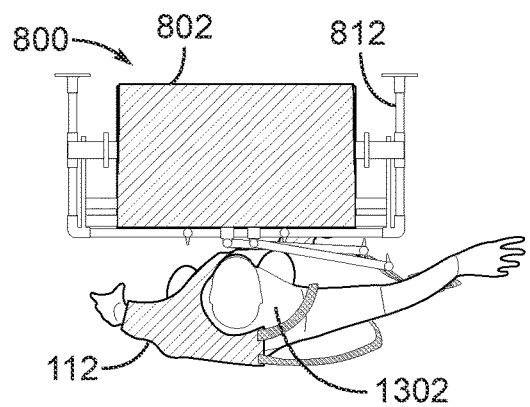
FIG. 15B
FIG. 16B

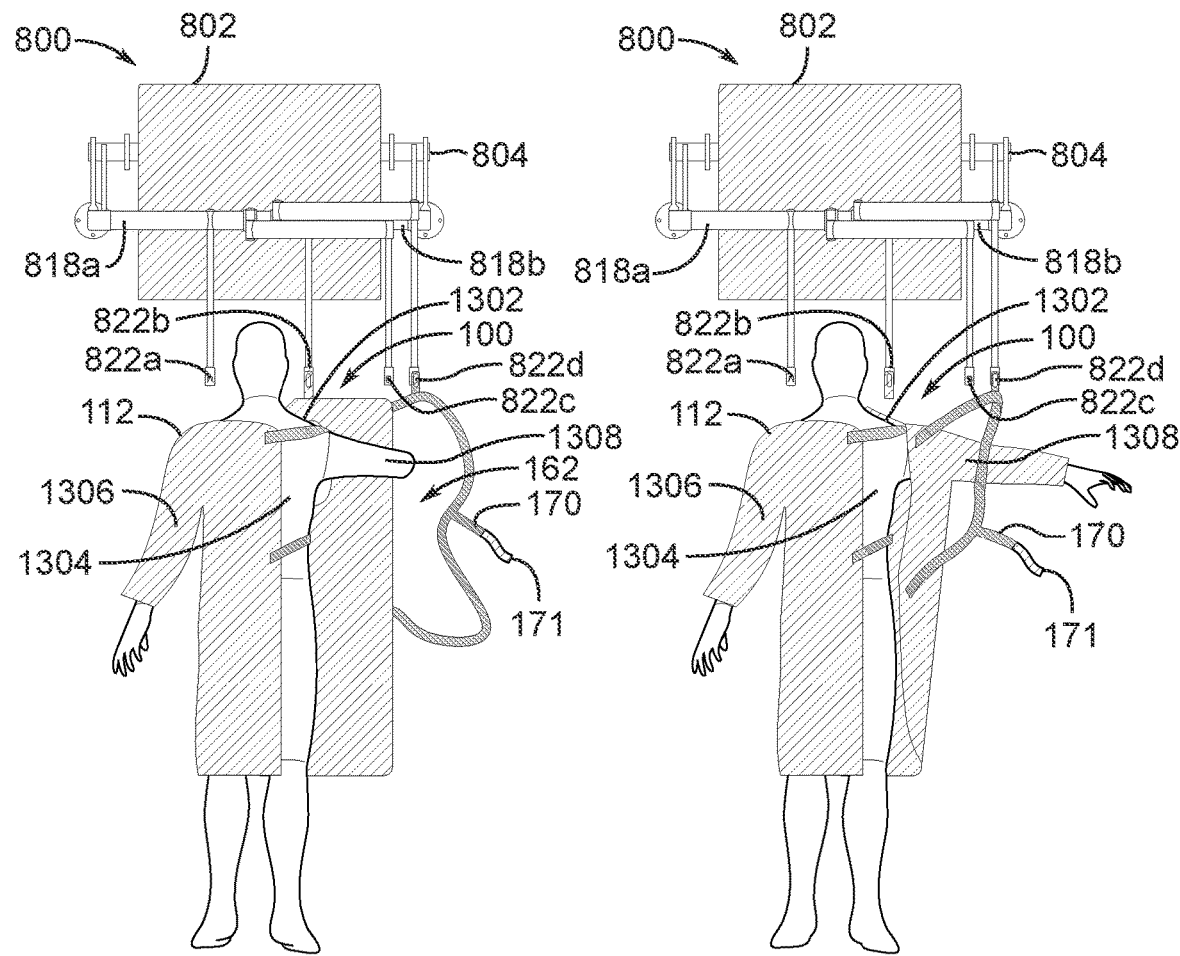
FIG. 17A    FIG. 18A
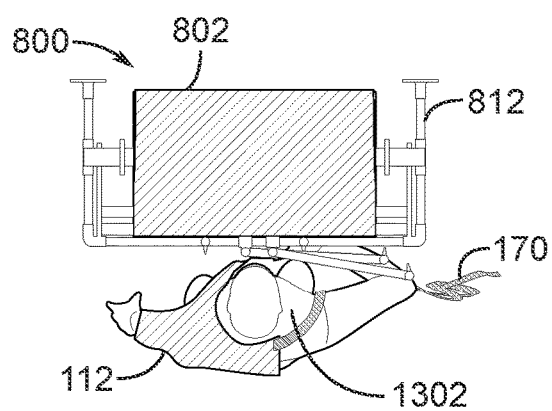 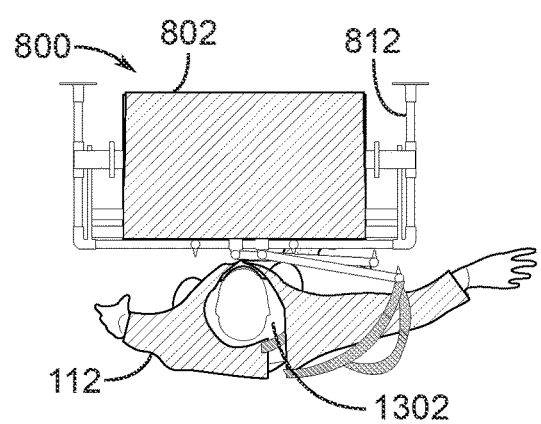
FIG. 17B    FIG. 18B

MEDICAL GOWN, PACKAGING OF SAME, AND METHODS FOR EXPEDITED DONNING

CROSS-REFERENCE TO RELATED APPLICATIONS

This application is a divisional of U.S. patent application Ser. No. 17/548,024, filed on Dec. 10, 2021, and entitled "Donning Station For Personal Protective Equipment," which claims the benefit of priority pursuant to 35 U.S.C. § 119(e) of U.S. Provisional Application No. 63/227,440, filed Jul. 30, 2021, and entitled "Donning Station For Personal Protective Equipment," which are hereby incorporated by reference in their entireties for all purposes.

FIELD

The described examples relate generally to personal protective equipment, methods of donning, and associated systems.

BACKGROUND

Medical professionals, including those in research, examination, and treatment may be required, upon entering a given area (laboratory, patient room, examination room, surgery suite, etc.), to protect themselves and/or others located in the same area. In many cases, to protect themselves and others, the medical professionals are required to don personal protective equipment (PPE) before entering those areas. Finding, selecting, and donning PPE may be a slow, time-consuming, difficult, and/or inefficient process requiring the professional to search various locations for the needed item, the proper size, as well as un-package the item, unfurl/spread-out the item, don the item, and/or fasten the item. As such, there is a need for systems and techniques to facilitate PPE donning.

SUMMARY

Examples of the present invention are directed to medical gowns, packagings of same, and methods for expedited donning and fastening.

In one example, a medical gown is disclosed. The medical gown includes a main body having a neck edge, a first side edge, and a second side edge. The first side edge extends from the neck edge. The second side edge extends from the neck edge, opposite the first side edge. The neck edge defines a neck engagement feature between the first and second side edges. The medical gown further includes a first strap feature coupled with the main body and defining a first loop with the first side edge. The medical gown further includes a second strap feature coupled with the main body and defining a second loop with the second side edge.

In another example, the main body may further include a terminal edge extending from the first side edge to the second side edge, opposite the neck edge. Further, the first strap feature may include a first strap forming the first loop. The first strap may have a first strap top end connected to the main body adjacent an intersection of the neck edge and the first side edge. The first strap may further have a first strap bottom end connected to the main body at the first side edge and offset from the neck edge and the terminal edge. The first loop may be configured to extend generally from a backside of a user to a front side of the user, receiving a length of an arm of the user. In some cases, the first strap may include an elastic component configured to permit expansion of the first loop to an expanded state to accommodate a user. In the expanded state of the first loop, the elastic component may exert a return force that causes the first strap to substantially conform to a shape of the user.

In another example, the second strap feature may include a second strap first portion having a second strap top end connected to the main body adjacent an intersection of the neck edge and the second side edge. The second strap feature may include a second strap second portion having a second strap bottom end connected to the body at the second side edge and offset from the neck edge and the terminal edge. The second strap first portion and the second strap second portion may be connected with one another to form the second loop with the second strap first portion defining a cross belt, and the second strap second portion defining a lap belt for the user. Further, the second strap feature may include a fastening feature configured to secure the second strap feature relative to the main body.

In another example, a plurality of retention features may be configured for hanging the medical gown. The neck feature may be interposed between a first subset of retention features of the plurality of retention features and a second subset of the plurality of retention features. Further, the main body may include a first material portion and a second material portion. In this regard, the first subset of retention features may be coupled with at least one of the main body or the first strap feature. The first subset of retention features may be configured to cause a manipulation the first material portion relative to the second material portion in response to a first input force. Further, the second subset of retention features may be coupled with at least one of the main body or the second strap feature. The second subset of retention features may be configured to cause a manipulation of the second material portion relative to the first material portion in response to a second input force.

In another example, the first subset of retention features includes a first side tab extending form the main body and a first strap tab extending from the first strap feature. In response to the first input force at the first strap tab, the first strap tab may be configured to bend the first material portion. The first subset of retention features may include one or more first tabs and the second subset of retention features may include one or more second tabs. Each tab of the one or more first tabs and the one or more second tabs having an aperture extending through the respective tab.

In another example, the aperture of each respective tab is configured to receive a manipulation feature of a gown dispensing device. Each respective tab may be formed from a tab body. The tab body may define a peripheral region about the aperture. The peripheral region of each respective tab may be, collectively, configured to support a weight of the medical gown for hanging on the manipulation features. Further, the peripheral region of each respective tab may be, collectively, configured to rupture upon a downward force supplied by a user of the medical gown.

In another example, the medical gown may further include a first arm feature and a second arm feature. The first arm feature and the second arm feature may extend from the main body and define respective first and second sleeves for arms of a user. In a first configuration, the first and second arm features may be substantially collapsed, with the first and second sleeves closed. In a second configuration, in response to a burst of air, one or both of the first or second arm features may be substantially unfurled, with the corresponding first or second sleeves open for receipt of the arms of the user.

In another example, a packaging assembly of medical gowns is disclosed. The packaging assembly includes a first medical gown. The first medical gown includes a first main body having a first neck edge and a first terminal edge opposite the first neck edge. The packaging assembly further includes a second medical gown. The second medical gown includes a second main body having a second neck edge, a second terminal edge opposite the second neck edge, and a plurality of tabs configured for hanging the second medical gown and disposed along the second neck edge. The packaging assembly further includes an interface between the first terminal edge of the first medical gown and the second neck edge of the second medical gown. The first and second medical gowns may be removably coupled along the interface such that, in a first configuration, the first and second medical gowns are physically connected to one another. The first and second medical gowns may be removably coupled along the interface such that, in a second configuration, the first and second medical gowns are physically separated from one another.

In another example, the interface may be defined by a line of perforations extending along the first terminal edge and the second neck edge. For example, the second medical gown may include a plurality of sacrificial connectors extending form the second neck edge and adhered to the first terminal edge. The line of perforations may be defined, collectively, by the sacrificial connectors.

In another example, the plurality of tabs may be removably adhered to the first terminal edge and cooperate to define the interface.

In another example, the first and second medical gowns may be at least partially folded and arranged in the packaging assembly in one of a roll or a stack.

In another example, a method of donning a medical gown is disclosed. The method includes presenting the medical gown suspended from a plurality of retention features disposed along a neck edge of the medical gown. The neck edge is defined by a main body of the medical gown. The method further includes manipulating the main body via the plurality of retention features to partially encompass a torso of a user with the main body and provide access to the user to one or more strap features of the medical gown.

In another example, the method may further include causing the medical gown to become unfurled using one or both of a mechanical input force or a fluidic input force. The fluidic input force may be provided by a burst of air delivered by a gown dispensing device.

In another example, the plurality of retention features may include a plurality of tabs having an aperture extending therethrough. In this regard, the presenting may further include hanging plurality of tabs on respective ones of a corresponding plurality of manipulation features of a gown dispensing device.

In another example, the neck edge includes a neck feature that may be interposed between a first subset of retention features of the plurality of retention features and a second subsets of the plurality of retention features. Further, the main body may include a first material portion and a second material portion. The medical gown may further include a first arm feature and a second arm feature. The first arm feature and the second arm feature may extend from the main body and define respective first and second sleeves for arms of a user. In this regard, the method may further include receiving a first arm of the user in the first sleeve. The method may further include causing the first material portion to wrap partially around the torso using a first subset of the retention features.

In another example, the one or more strap features may include a first strap feature coupled with the main body and defining a first loop with a first side edge of the main body. In this regard, the method may further include, subsequent to the receiving of the first arm of the user in the first sleeve, receiving a second arm through the first loop and securing the first material portion relative to the user.

In another example, the method may further include receiving a second arm of the user in the second sleeve. The method may further include causing the second material portion to wrap partially around the torso and a section of the first material portion using the second subset of retention features.

In another example, the one or more strap features may include a second strap feature coupled with the main body and defining a second loop with a second side edge of the main body. In this regard, the method may further include, subsequent to the receiving of the second arm of the user in the second sleeve, receiving the first arm through the second loop. The method may further include, subsequent to causing the second material portion to wrap partially around the torso, securing the second strap feature to the main body.

In addition to the exemplary aspects and examples described above, further aspects and examples will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIG. 6 depicts a stack of medical gowns;

FIG. 8A depicts an operation of a gown donning system;

FIG. 8B depicts another operation of the gown donning system of FIG. 8A;

FIG. 8C depicts another operation of the gown donning system of FIG. 8A;

FIG. 15A depicts a rear view of another operation of donning a medical gown;

FIG. 15B depicts a top view of the operation of donning a medical gown of FIG. 15A;

FIG. 16A depicts a rear view of another operation of donning a medical gown;

FIG. 16B depicts a top view of the operation of donning a medical gown of FIG. 16A;

FIG. 17A depicts a rear view of another operation of donning a medical gown;

FIG. 17B depicts a top view of the operation of donning a medical gown of FIG. 17A;

FIG. 18A depicts a rear view of another operation of donning a medical gown;

FIG. 18B depicts a top view of the operation of donning a medical gown of FIG. 18A;

Figure 1:
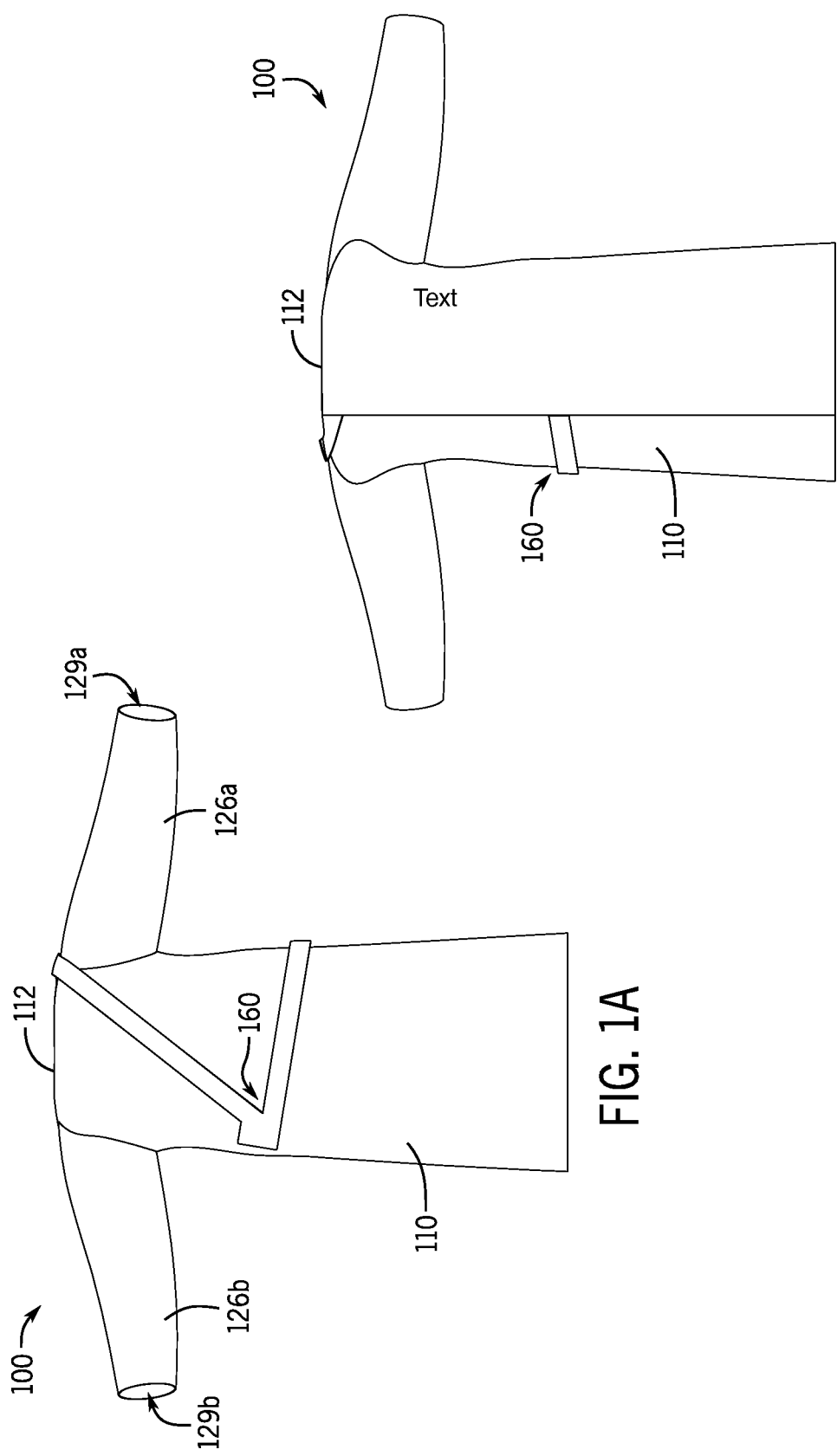
FIG. 1A depicts a front view of an example medical gown.
FIG. 1B depicts a back view of the medical gown of FIG. 1A.

In addition to the exemplary aspects and examples described above, further aspects and examples will become apparent by reference to the drawings and by study of the following description.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to medical gowns, packagings of same, and methods for expedited donning. Broadly, a medical gown may include substantially any gown, apron, smock, sheet, or other item that is used for personal protective equipment (PPE). Conventional PPE may be particularly cumbersome and inefficient to don. For example, conventional PPE may include a central sheet or material layer with free hanging bands of material coming off either side. A medical professional may don conventional PPE by placing the central sheet adjacent their torso and securing the sheet by tying the free hanging bands together. Tying or otherwise securing the bands in this manner may be difficult and time-consuming, and often can only be done with assistance from others. Further, conventional PPE and donning techniques may require substantial interaction with the central sheet and/or other materials by the medical professional and/or assistant(s), which may impact the effectiveness of the PPE in establishing a protective barrier between the professional and given area and/or patient.

The medical gowns of the present disclosure, and associated systems and methods, may mitigate such hindrances by providing PPE that may be easier, quicker, and more efficient to don. The medical gown may be used with a gown dispensing device or system that is broadly configured to automate donning of the medical gown. Accordingly, the medical gown may include various features and functions and may be configured to support the automated or substantially automated donning of the medical gown. Without limitation, such features may include those which allow the medical gown to be manipulated by the gown dispensing device in addition to those which allow the medical gown to be secured to a user without assistant of others.

It will be appreciated that many constructions of the medical gown are possible and described and contemplated herein. In one example, the medical gown may include a main body including a neck edge, and first and second side edges extending from opposite sides of the neck edge. The main body may define a main protective region of the medical gown that is configured to cover a torso of a user, and may extend to or beyond the user's knees. At the neck edge, the main body may define a neck feature for receiving a neck of a user, while the first and second side edges may be wrapped around either side of the torso such that the user is substantially wrapped in the main body.

The main body may be configured to be wrapped about the torso in a substantially automated process by the gown dispensing device. To facilitate the foregoing, the medical gown may include a plurality of retention features. In some embodiments, the retention features may be disposed along the neck edge. In these embodiments, the plurality of retention features may be configured for hanging or suspending the medical gown from a gown dispensing device. For example, the plurality of retention features may include a plurality of tabs that extend from the neck edge and define an aperture or other feature to facilitate suspending the medical gown from the tab. The plurality of retention features may also be used to bend, fold, or wrap the main body about the torso during donning of the medical gown. For example, and as described herein, the retention features may receive an input force from the gown dispensing device that causes a respective retention feature to move. The respective retention feature may move, and correspondingly pull the main body such that the material of the main body bends or folds or wraps about a user.

The medical gown of the present disclosure may be secured to a user substantially without the assistance of others, such as without the assistance of another user tying or otherwise securing the gown for the primary user or wearer of the medical gown. To facilitate the foregoing, the medical gown may include a first strap feature coupled with the main body and defining a first loop with the first side edge. Further, the medical gown may further include a second strap feature coupled with the main body and defining a second loop with the second side edge. One or both of the first and second strap feature may be wrapped or moved about the user during donning such that the user may conveniently manipulate the first and/or second strap features and fasten the medical gown to themselves and/or the main body of the medical gown.

To illustrate, during a sample donning operation, a user may insert a first arm (e.g., a left arm) into a first arm feature of the medical gown, which is adjacent the first side edge. Using a first subset of the plurality of retention features, a first material portion of the medical gown and the first strap feature may be partially wrapped about a backside of the user. This operation may bring the first strap feature adjacent to a second arm (e.g., a right arm) of the user, thereby allowing the user to insert the second arm in the first loop that is defined by the first strap feature and the first side edge. The first strap feature may include an elastic component to compress or conform the first strap feature to the user for a snug fit. Next, a user may insert the second arm into the second arm feature of the medical gown, which is adjacent the second side edge. Using a second subset of the plurality of retention features, a second material portion of the medical gown and the second strap features may be partially wrapped about the back of the user. This operation may bring the second strap feature adjacent to the first arm of the user, thereby allowing the user to insert the first arm in the second loop that is defined by the second strap feature and the second side edge. The second strap feature may then present at a front of the user, forming a cross-belt over the front, and permit the user to fasten the second strap feature to the medical gown as appropriate.

Turning to the Drawings, FIGS. 1A and 1B depict a medical gown 100, such as the medical gown discussed generally above and described in greater detail below. The medical gown 100 may broadly include substantially any form of PPE that is configured to form a protective barrier between a wearer of the gown and a given area or patient. Further, the medical gown 100 may be a gown, or apron, smock, sheet or other item of a variety of constructions and purposes that is used in an automated or substantially automated donning process. In this regard, the medical gown 100 may include various features and components to facilitate use of the medical gown 100 with systems, device, assemblies, and so on that are capable of manipulating the medical gown 100 for automated or substantially automated donning.

The medical gown 100 may generally include a main body 110, a first arm feature 126a, and a second arm feature 126b. As shown in front view of FIG. 1A, the medical gown 100 is presented in a configuration in which the medical gown 100 may be worn, with the main body 110 and arm features 126a, 126b cooperating to establish a protective barrier along a front side of a prospective wearer. A strap feature 160 is also shown in the front view of FIG. 1A. As described in greater detail below, the strap feature 160 may define a lap and/or cross-belt for securing the medical gown 100 at the end of a process for donning the medical gown 100. As shown in the rear view of FIG. 1B, the medical gown 100 is presented in a configuration in which the medical gown 100 may be worn, with the main body 110 and arm features 126a, 126b cooperating to establish a protective barrier along a rear side of the prospective wearer. The strap feature 160 is shown extending from a portion of the main body 110 and about the first arm feature 126a to promote securing of the medical gown.

Figure 2:
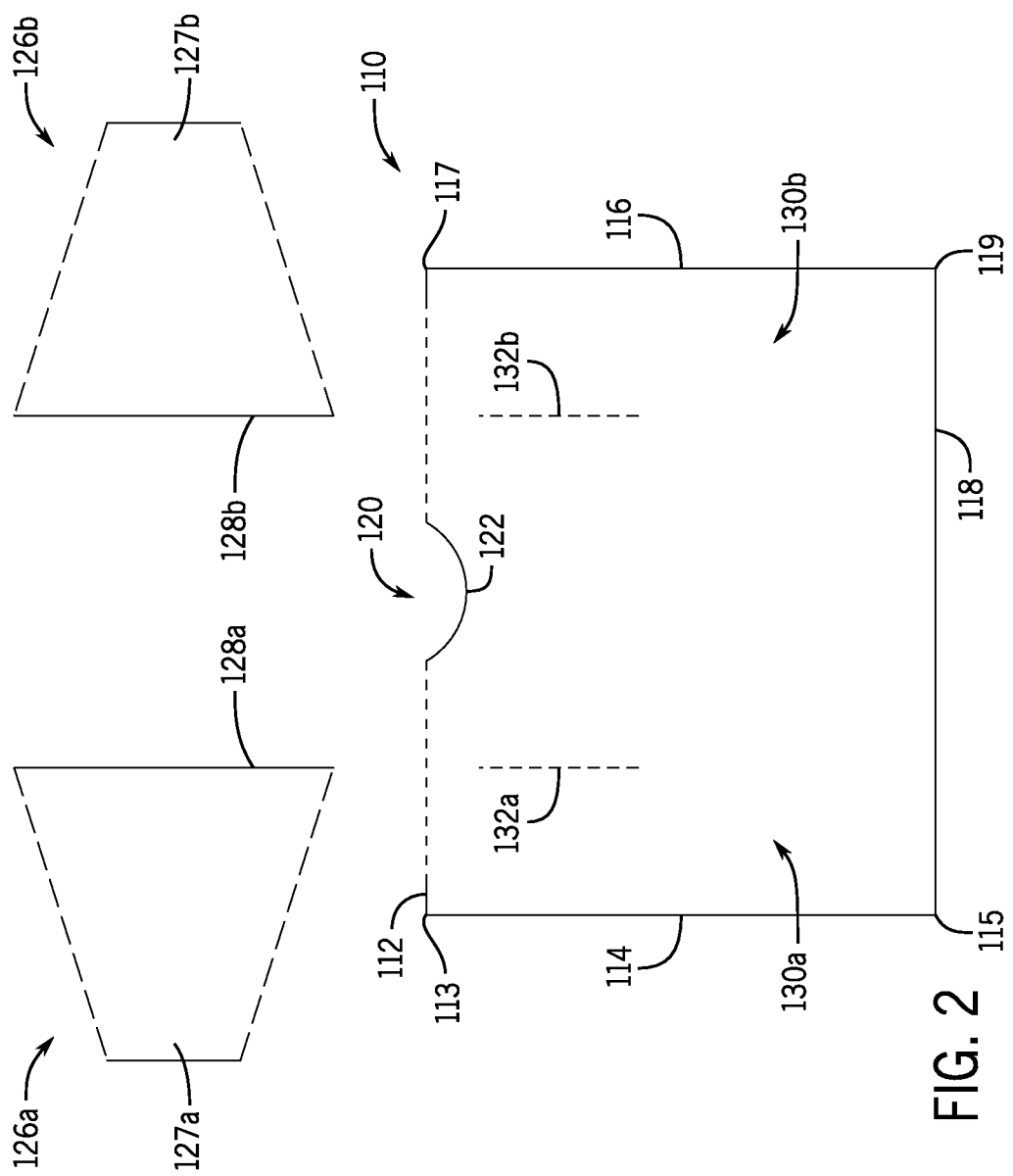
FIG. 2 depicts a material pattern for the medical gown of FIG. 1A.
Figure 3:
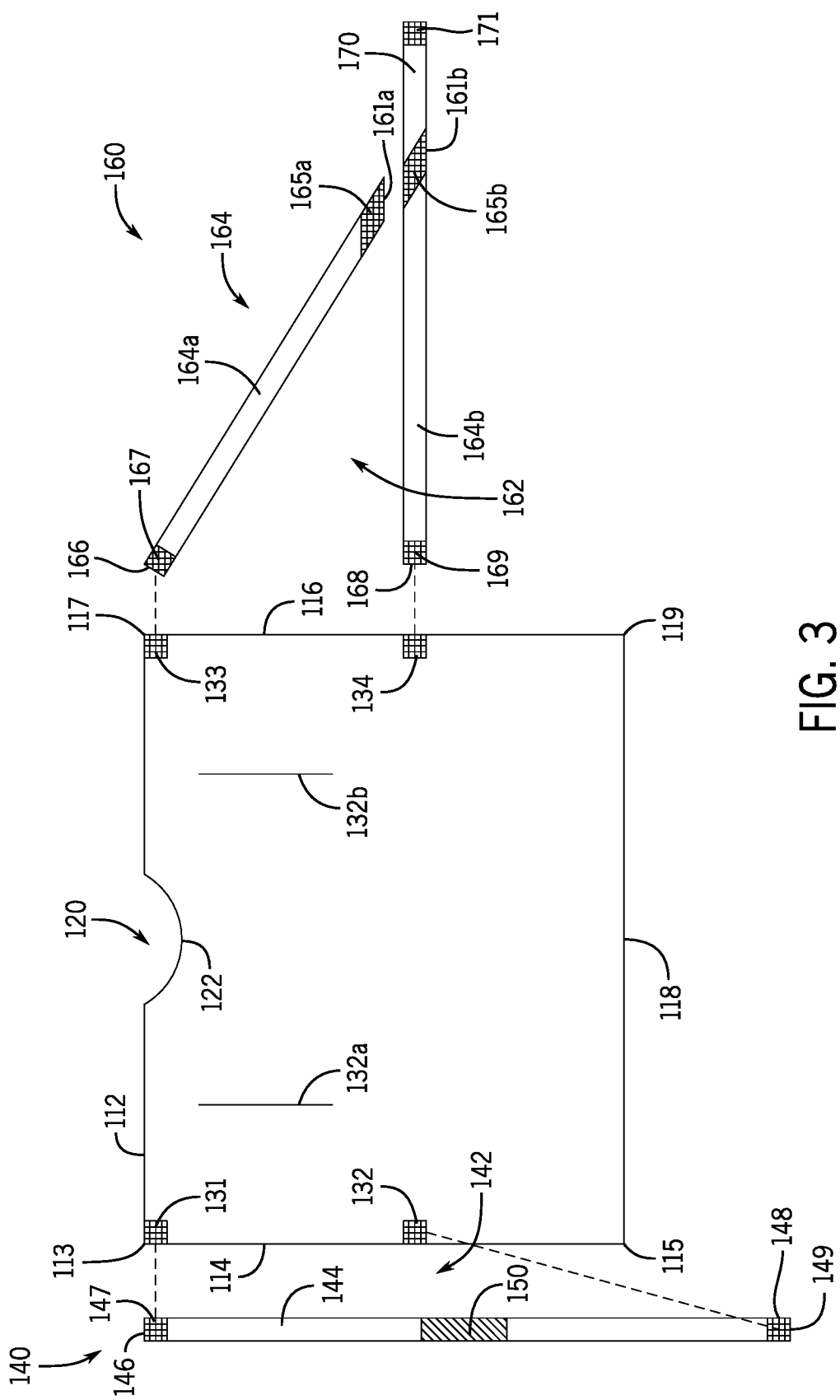
FIG. 3 depicts an exploded view of the medical gown of FIG. 1A.

With reference to FIGS. 2 and 3, example material patterns of the medical gown 100 are shown. For example, the medical gown 100 may be constructed by connecting individual material component to one another, such as connecting individual fabrics, bands, sheets, elastic components and so. The material component may have particular shapes and configurations such that upon assembly, the material components cooperate to form the medical gown 100. It will be appreciated however, that while various components are described below with reference to FIGS. 2 and 3, this is for purposes of illustration. Other constructions and patterns, including medical gowns 100 having more or fewer or differently shaped or configured material components are possible and contemplated herein.

FIG. 2 shows the medical gown 100 including the main body 110 and the first arm feature 126a and the second arm feature 126b. With reference to the main body 110, this component may formed form various materials, including spunbond polypropylene materials, polypropylene, polyester, or polyethylene. The main body 110 is shown in FIGS. 2 and 3, as including a neck edge 112, a first side edge 114, a second side edge 116, and a terminal edge 118. The first side edge 114 may generally extend from the neck edge 112, with the first side edge 114 and the neck edge 112 forming an intersection 113. Further, the second side edge 116 may generally extend from the neck edge 112 opposite the first side edge 114, with the second side edge 116 and the neck edge 112 forming an intersection 117. Further, the terminal edge 118 may extend between an intersection 115 with the first side edge 114 and an intersection 119 with the second side edge 116. The main body 110 may therefore have a generally rectangular shape and the intersections 113, 115, 117, 119 may define corners of the generally rectangular shape. In other configurations, different shapes are possible, including irregular shapes and those having more or fewer sides or edges.

The main body 110 may include a neck feature 120. The neck feature 120 may be defined along the neck edge 112. For example, the neck feature 120 may be defined by a contoured section 122 of the neck edge. The contoured section 122 may have a depth and width in order to partially receive a neck of a wearer of the medical gown 100. The contoured section 122 may be generally arranged between the first side edge 114 and the second side edge 116, such as being generally equidistant the edges 114, 116. In other cases, the contoured section 122 may be closer to one of the edges 114, 116 based on a particular application, pattern, or construction.

Broadly, the main body 110 may include a first material portion 130a and a second material portion 130b. The first and second material portions 130a, 130b may be defined by generally first and second, left and right, regions or roughly halves of the main body 110. As described herein below, the medical gown 100 may be further configured to permit manipulation or bending of the first and second material portions 130a, 130b relative to one another in order to facilitate substantially wrapping the main body 110 about a torso of a wearer. At the first material portion 130a, the main body 110 may include a first arm cut 132a. At the second material portion 130b, the main body 110 may include a second arm cut 132b. The first and second arm cuts 132a, 132b may be passages that extend through a complete thickness of the main body 110. The first and second arm cuts 132a, 132b may be large enough to receive an arm of the wearer.

With further reference to the material pattern of FIG. 2, the medical gown 100 is shown with the first arm feature 126a including a first arm material 127a. The first arm material 127a may define a first arm hole 128a. The medical gown 100 is further shown in FIG. 2 with the second arm feature 126b including a second arm material 127b. The second arm material 127b may define a second arm hole 128b. The medical gown 100 may be coupled such that the first arm material 127a may be attached to the main body 110. The first arm material 127a may be attached to the main body 110 and the first arm hole 128a and the first arm cut 132a may be substantially aligned with one another. The medical gown 100 may further be coupled such that the second arm material 127b may be attached to the main body 110. The second arm material 127b may be attached to the main body 110 and the second arm hole 128b and the second arm cut 132b may be substantially aligned with one another.

Figure 14A:
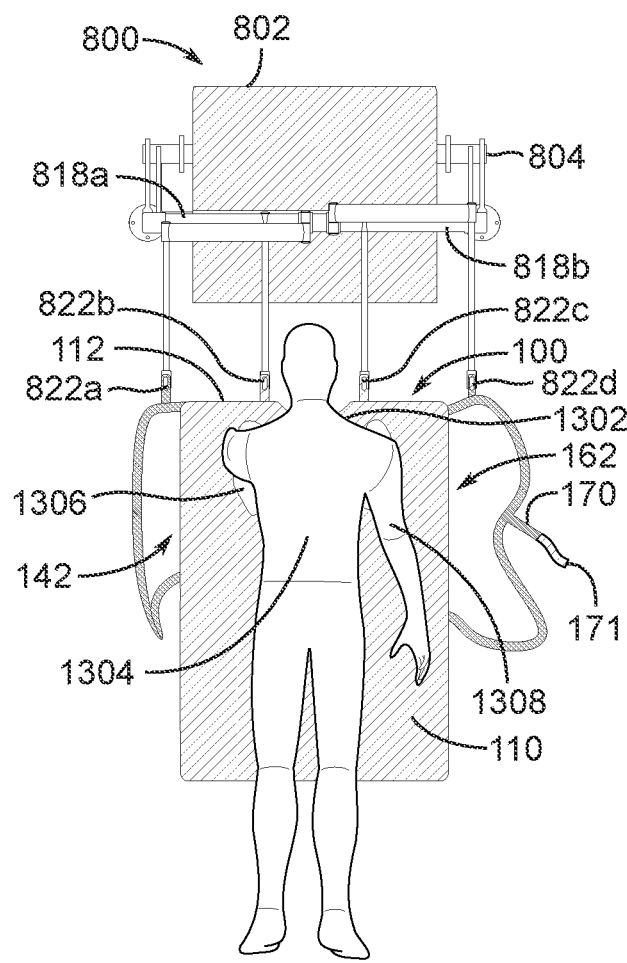
FIG. 14A depicts a rear view of another operation of donning a medical gown.

Turning to FIG. 3, the material pattern of the medical gown 100 is shown including various strap features. The strap features may facilitate donning of the medical gown in an automated or substantially automated process. The strap features may also be used to don the medical gown 100 manually. The strap features may further facilitate donning of the medical gown 100 without the assistant of others, such as without the assistance of other personal to tie loose hanging bands of the gown. For purposes of illustration, FIG. 3 shows a first strap feature 140 and a second strap feature 160. The first strap feature 140 may be coupleable with the main body 110 and define a first loop 142 with the first side edge 114 (FIG. 14A). The second strap feature 160 may be coupleable with the main body 110 and define a second loop 162 with the second side edge 116 (FIG. 14A).

In the example of FIG. 3, the first strap feature 140 is shown as including a first strap 144. The first strap 144 may include an elongated shape of material and/or combination of materials that extends in a band-like formation from one portion of the medical gown 100 to another. The first strap 144 may include a first strap top end 146 and a first strap bottom end 148. The ends 146, 148 may be terminal ends of the first strap 114 with a run of the first strap 144 extending therebetween. The first strap top end 146 may include or be associated with a connecting region 147. The first strap bottom end 148 may include or be associated with connecting region 149. The connecting regions 147, 149 may include adhesive and/or have other characteristics to facilitate coupling the first strap feature 140 the main body 110. In some cases, the medical gown 100 may further include an elastic component 150 disposed along a run of the first strap 144. The elastic component 150 may be configured to permit expansion of the first loop 142 to accommodate a user. The elastic component 150 may be further configured, in the expanded state, to exert a return force that causes the first strap feature 140 to substantially conform to a shape of the user.

The second strap feature 160 is shown in FIG. 3 as including a second strap 164. The second strap 164 may include one or more pieces of material that cooperate to define a lap belt and/or cross-belt type shape, such as that shown in the as worn configuration of FIG. 1A. To facilitate the foregoing, the second strap 164 may include a second strap first portion 164a and a second strap second portion 164b. The portions 164a, 164b may include an elongated shape or run of material and/or combination of materials that extends in a band-like formation and that cooperate with one to form the lap belt and/or cross-belt configuration. The second strap first portion 164a may include a second strap top end 166 and a cross-belt end 165a. The ends 166, 165a may be terminal ends of the second strap first portion 164a with a run of the second strap first portion 164a extending therebetween. The second strap top end 166 may be associated with a connecting region 167 and the cross-belt end 165a may be associated with a connecting region 161a. The connecting regions 167, 161a may include adhesive and/or have other characteristics to facilitate coupling the second strap feature 160. Further, the second strap second portion 164b may include a second strap bottom end 168 and a cross-belt end 165b. The ends 168, 165b may be terminal ends of the second strap second portion 164b with a run of the second strap second portion 164b extending therebetween. The second strap bottom end 168 may be associated with a connecting region 169 and the cross-belt end 165b may be associated with a connecting region 161b. The connecting regions 168, 161b may include adhesive and/or have other characteristics to facilitate coupling the second strap feature 160. The second strap second portion 164a is further shown in FIG. 3 as including a fastening end 170. The fastening end 170 may include one or more fastening features 171 to facilitate securing the medical gown 100, using the second strap feature 160. As one example, the fastening features 171 may include hook and loop type fasteners in order to removably attach the fastening end 170 to the main body 110.

In one example, the medical gown 100 may be coupled such that the first and second strap features 140, 160 are secured to the main body 110. To illustrate, the main body 110 may include or be associated with a mounting region 131 at the intersection 113. The connecting region 147 of the first strap feature 140 may be connected, such as being adhered to, the main body 110 at the mounting region 131. Further, the main body 110 may include or be associated with a mounting region 132, which may offset from or between the intersections 113, 115. The connecting region 149 of the first strap feature 140 may be connected, such as being adhered to, the main body 110 at the mounting region 132.

With respect to the second strap feature 160, the second strap feature first portion 164a may be connected to the second strap feature second portion 164b by connecting, such as adhering, the connecting regions 161a, 161b. The portions 164a, 164b may be connected with one another such that second strap first portion 164a extends from the second strap second portion 164b at an angle less than 90 degrees, such as being less than 75 degrees, such as being less than 60 degrees, such as being less than 45 degrees, such that the portions 164a, 164b form the cross-belt pattern shown in FIG. 1A. Further, the main body 110 may include or be associated with a mounting region 133, which may be at the intersection 117. The connecting region 167 of the second strap feature 160 may be connected, such as being adhered to, the main body 110 at the mounting region 133. Further, the main body 110 may include or be associated with a mounting region 134, which may offset from or between the intersections 117, 119. The connecting region 169 of the second strap feature 160 may be connected, such as being adhered to, the main body 110 at the mounting region 134.

The medical gown 100 may further include various features to facilitate suspending the medical gown 100 and/or manipulating the medical gown 100 during an automated or substantially automated donning operation. For example, and with reference to FIG. 4, the medical gown 100 may include a plurality of retention features 180. The plurality of retention feature 180 may generally be configured for hanging or suspending the medical gown 100. In this regard, the plurality of retention features 180 may include hooks, tabs, straps, and/or other features or combinations that allow the medical gown 100 to be suspended. Additionally, the plurality of retention features 180 may generally be configured to cause a manipulation of the main body 110 in response to an input force. For example, the plurality of retention features 180 may cause one or both of the first or second material portions 130a, 130b to bend or flex about a user in response to a force received at one or more of the plurality of retention features 180. In this regard, the plurality of retention features 180 may be sufficiently robust to cause the material to move without tearing or separating from the material as appropriate.

Figure 4:
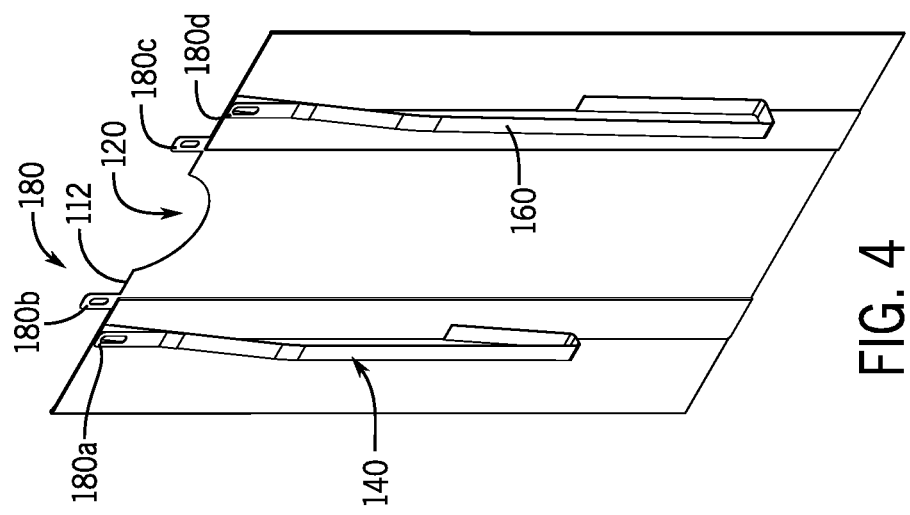
FIG. 4 depicts the medical gown of FIG. 1A include a plurality of retention features.

The plurality of retention features 180 may generally be disposed along a neck edge 112 of the main body 110 with the neck feature 120 interposed with the features. For example, and as shown in FIG. 4, a first retention features 180a and a second retention feature 180b may define a first subset of the plurality of retention features 180 and be disposed at a first side of the neck feature 120. Further, a third retention feature 180c and a fourth retention feature 180d may define a second subset of the plurality of retention features 180 and be disposed at a second side of the neck feature 120 opposite the first side. As shown in FIG. 4, the first retention feature 180a may be coupled to and extend from the first strap feature 140. The second retention feature 180b may be coupled to and extend from the main body 110. The third retention feature 180c may be coupled to and extend from the main body 110. The fourth retention feature 180d may be coupled to and extend from the main body second strap feature 160.

Figure 5A:
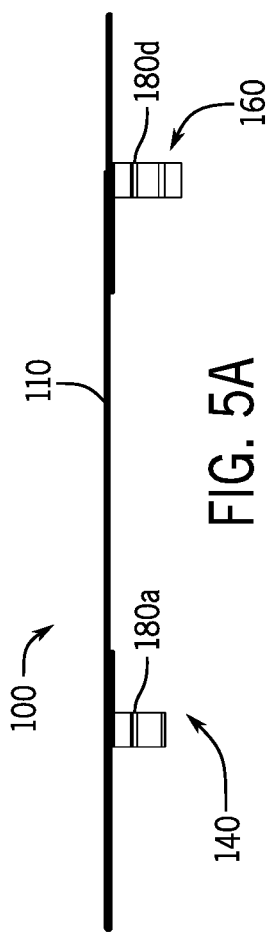
FIG. 5A depicts a top view of the medical gown of FIG. 4 in a first configuration.
Figure 5B:
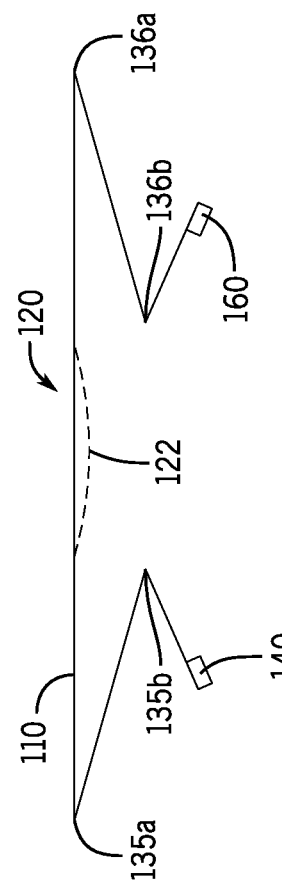
FIG. 5B depicts a top view of the medical gown of FIG. 4 in a second configuration.

In one example, the medical gown 100 may be presented, suspended from the plurality of retention feature 180, and folded, as shown in FIG. 4. The plurality of retention features 180 may be configured to manipulate the main body 110 such that the main body 110 unfolds to facilitates donning. To illustrate, FIG. 5A shows a top view of the suspended medical gown 100 of FIG. 4. In the top view shown in FIG. 5A, the medical gown 100 appears folded and exhibits a compressed or flattened contour. One or more or all of the plurality of retention features 180 may be used to help unfold the main body 110. For example, and as shown in FIG. 5B, a top view of medical gown 100 is depicted in a partially unfolded configuration. In the partially unfolded configuration, the first subset of the plurality of retention features 180 may cooperate to unfold the main body 110, for example, by moving the main body 110 and unfolding first and second first side folds 135a, 135b. Further, the second subset of the plurality of retention features 180 may cooperate to unfold the main body 110, for example, by moving the main body 110 and unfolding first and second side folds 136a, 136b. In some cases, the unfolding may occur in the context of a donning operation in which the plurality of retention features 180 are manipulate in order to wrap the main body 110 about a user, as described herein.

Figure 9B:
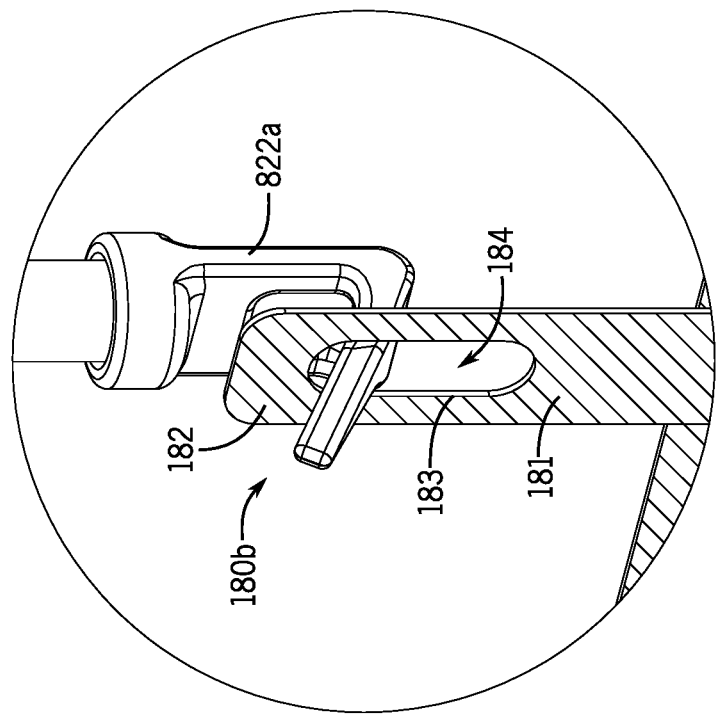
FIG. 9B depicts detail 9B-9B of FIG. 9A.
Figure 9A:
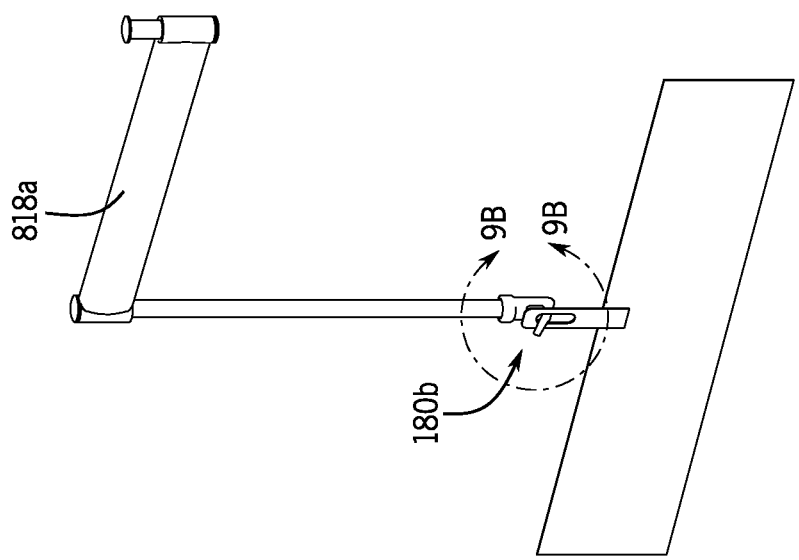
FIG. 9A depicts a retention feature of the medical gown of FIG. 4 engaged with a manipulation feature of a gown dispensing device.
Figure 10A:
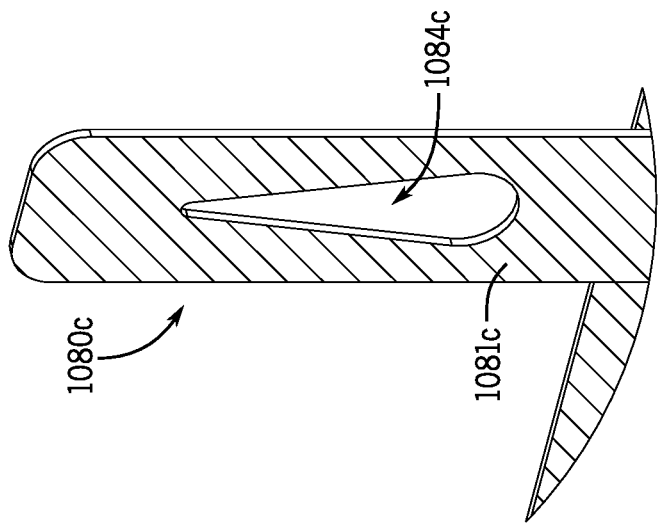
FIG. 10A depicts an example retention feature.
Figure 10B:
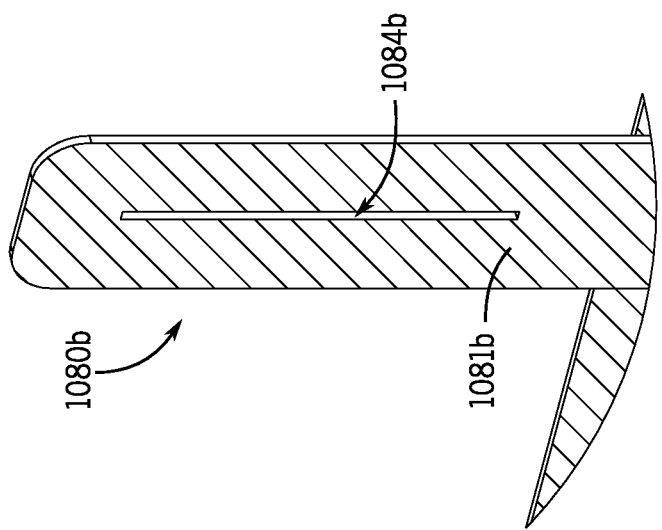
FIG. 10B depicts another example retention feature.
Figure 10C:
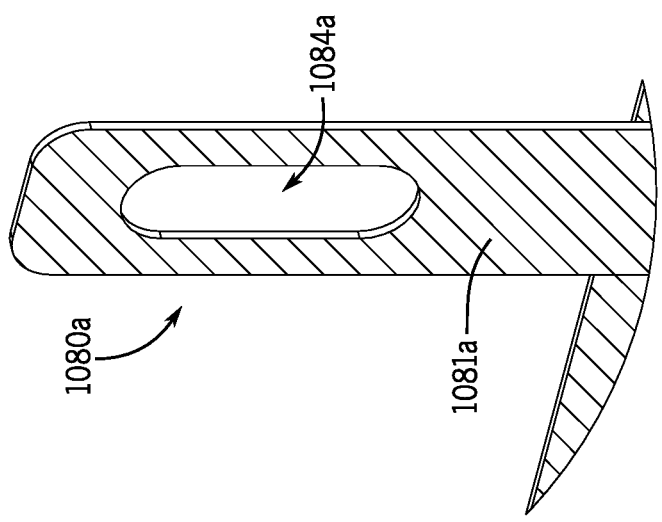
FIG. 10C depicts another example retention feature.

FIGS. 9-10C provide example constructions of the retention features contemplated herein. For purposes of illustration, the second retention features 180b is shown and described. It will be appreciated that the following description of the retention feature 180b may be applicable to any of the retention features described herein. The second retention feature 180b may include a tab that extends from the main body 110 (or the strap feature, in the case of the first or fourth retention features 180a, 180d). The tab may be a protruding strip of material from the main body 110. For example, the second retention feature 180b may include a tab body 181 that is fixed to the main body 110 at one end. The other opposing end of the tab body 181 may be a free end that is moveable relative to the main body 110. The tab body 181 may include a peripheral region 182 that extends about an aperture 184 of the tab. A shape of the aperture 184 may be defined by an aperture edge 183. The aperture 184 may extend through a complete thickness of the tab body 181. The aperture 184 may be configured to receive a manipulation feature of a gown hanging or gown dispensing device, such as the manipulation feature 822a shown in FIG. 9B. The peripheral region 182, in combination with the peripheral regions of the other tabs, may collectively be configured to support a weight of the medical gown 100. In this regard, the medical gown 100 may be placed on the manipulation feature 822a and suspended therefrom, using the plurality of retention features 180. Notwithstanding the robustness, the peripheral region 182, may be configured to rupture in response to a sufficient downward force supplied by a user of the medical gown 100. In this regard, the medical gown 100 may be suspended from a manipulation feature and pulled off of the manipulation feature as needed, this may obviate the need for the user to disengage the retention feature 180b from the manipulation feature 822a by, for example, sliding or lifting the tab 182 and/or aperture 184.

In other examples, other constructions and geometries are possible. For example, FIG. 10A shows a retention feature 1080a formed form a tab body 1081a that defines an aperture 1084a. The retention feature 1080a may be substantially analogous to the retention feature 180b. Notwithstanding, the aperture 1084a may be elongated as compared with the aperture 184. As another example, FIG. 10B shows a retention feature 1080b formed form a tab body 1081b that defines an aperture 1084b. The retention feature 1080b may be substantially analogous to the retention feature 180b. Notwithstanding, the aperture 1084b may be defined by an elongated slit. For example, the aperture 1084b may long and narrow, and include a minimally sized opening. As another example, FIG. 10C shows a retention feature 1080c formed form a tab body 1081c that defines an aperture 1084c. The retention feature 1080c may be substantially analogous to the retention feature 180b. Notwithstanding, the aperture 1084c may have a different shape, such as a teardrop shape, as compared to the opening shape in FIG. 9A. In many embodiments, the shape of the aperture may be configured to engage a shape of a given manipulation feature.

The medical gowns of the present disclosure may be arranged in packaging assembly. For example, multiple medical gowns may be packaged together in order to facilitate efficient storage and use of the medical gowns from a common location or structure. With reference to FIG. 6, an assembly 600 of medical gowns in shown, schematically. The assembly 600 is shown as a substantially continuous assembly of gown material 604. The gown material 604 may schematically represent multiple individual medical gowns, such as multiple individual medical gown substantially analogous to the medical gown 100 described herein. The medical gowns may be substantially continuous with respect to having at least some portion of each medical gown contact at least one other, adjacent medical gown. For example, the medical gowns may be arranged in a stack having fold or pleats 608, as shown in FIG. 6, or a roll (FIG. 8A), such that the medical gowns are removably connected to one another, end-to-end, for dispensing in an efficient and centralized manner.

Figure 7A:
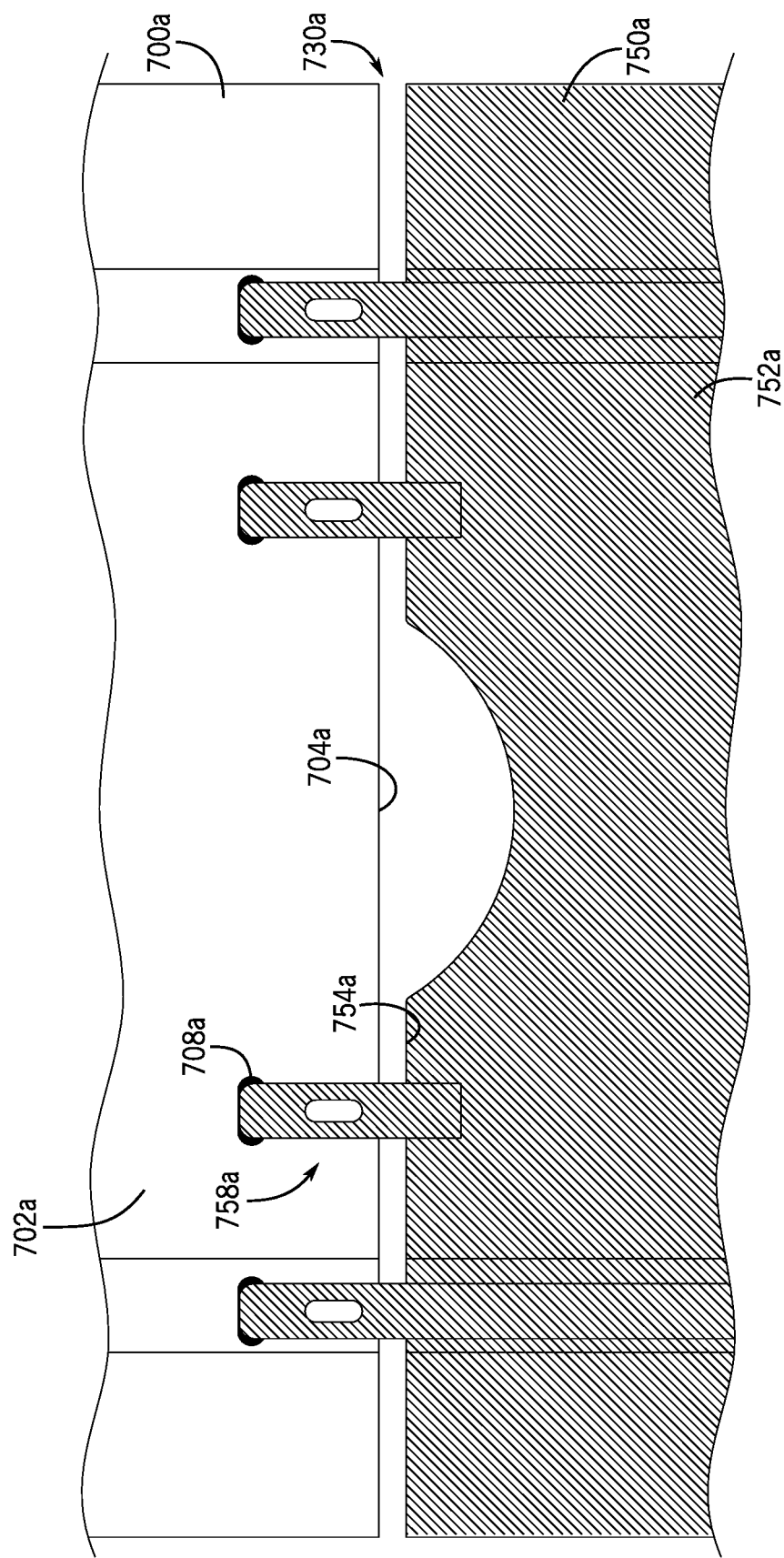
FIG. 7A depicts an example packaging assembly.
Figure 7B:
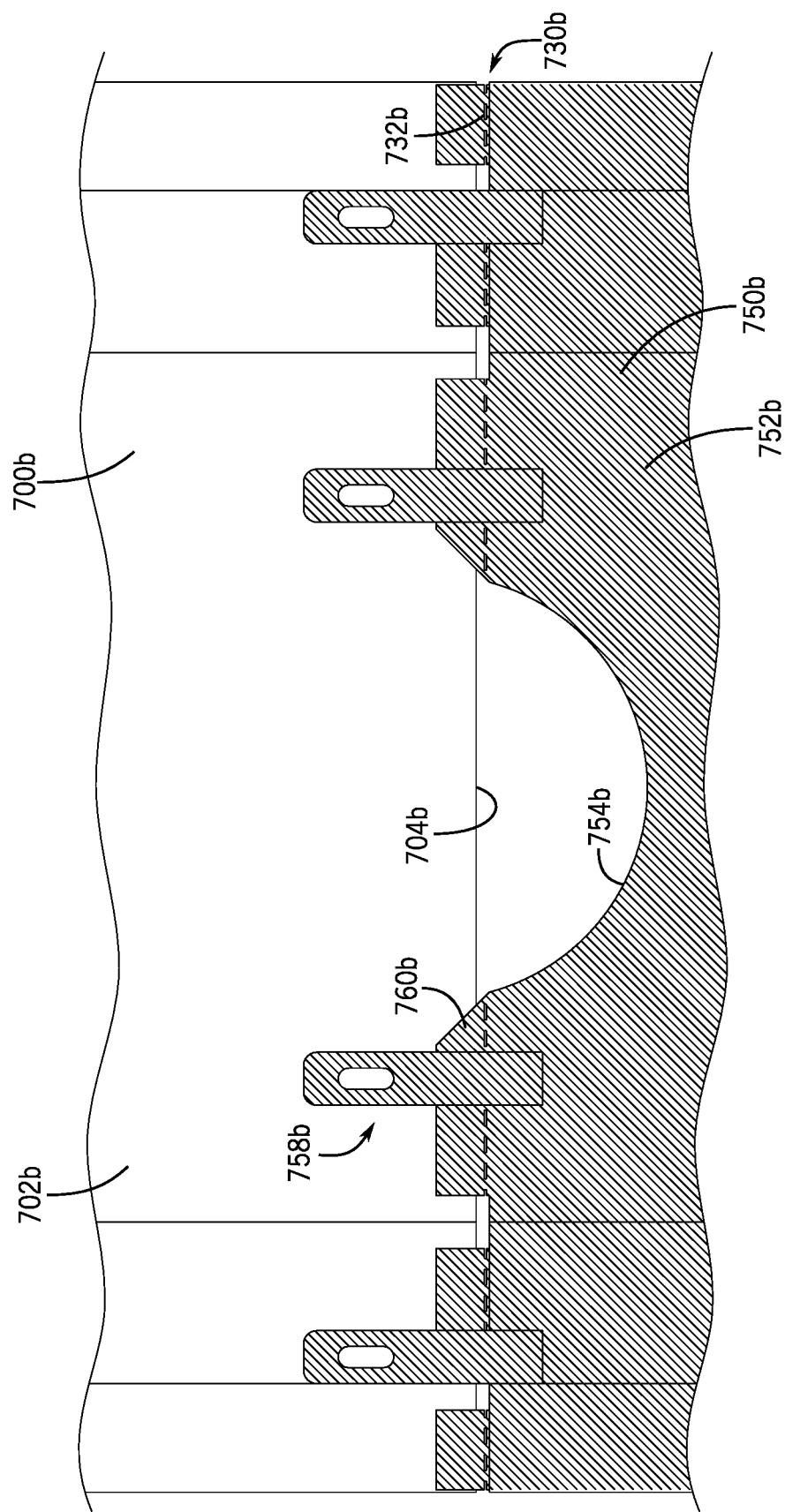
FIG. 7B depicts another example packaging assembly.

With reference to FIGS. 7A and 7B, two examples of connecting medical gowns to one another, such as in a roll or stack, are presented. In FIG. 7A, a first medical gown 700a and a second medical gown 750a are shown. The first and second medical gowns 700a, 750a may be substantially analogous to the medical gown 100 shown and described above. The first medical gown 700a is shown in FIG. 7A as having a first main body 702a and a terminal edge 704a. Along the terminal edge 704a, the main body 702a may define a series of receiving ports 708a. Further, the second medical gown 750a is shown in FIG. 7A as having a second main body 752a and a neck edge 754a. Along the neck edge 754a, the main body 752a may be connected with a plurality of tabs 758a, such as any of the retention features or tabs described herein. The first and second medical gowns 700a, 750a may be removably coupled to one another along an interface 730a. The interface 730a may generally extend along and between the terminal edge 704a and the neck edge 754a. The first and second medical gowns 700a 750a may be removably coupled to one another using the plurality of tabs 758a. For example, each tab of the plurality of tabs 758a may be adhered or otherwise connected to corresponding receiving ports of the receiving ports 708a. This may allow a user to advance medical gowns from a stack or roll by pulling one of the medical gowns. For example, the medical gown may be advanced with respect to a gown dispensing device. The advanced medical gown may then be separated from a bulk of the roll or stack of gowns for use in the dispensing device, as needed.

In FIG. 7A, the plurality of tabs 758a may be used to releasably secure adjacent gown to one another. The tabs 758a may further be subsequently used to suspend and manipulate the medical gown 750a. In the example of FIG. 7B, an arrangement is shown in which additional features are used to facilitate the removable coupling of adjacent gowns of the roll or the stack. For example, FIG. 7B shows a first medical gown 700b having a main body 702b and terminal edge 704b. FIG. 7B further shows a second medical gown 750b having a main body 752b, a neck edge 754b, and a plurality of tabs 758b. The arrangement of FIG. 7B further includes a plurality of sacrificial connectors 760b. The plurality of sacrificial connectors 760b may be generally connected to and formed from the same material as the main body 752b of the medical gown 750b. A line of perforations 732b may separate the plurality of sacrificial connectors 760b from the main body 752b. The plurality of sacrificial connectors 760b may be connected to, such as being adhered to, the main body 702b of the medical gown 700b along the terminal edge 704b, opposite the line of perforations 732b. The line of perforations 732b may extend along the interface 730b. The line of perforations 732b may be sufficiently robust such that the second medical gown 750b may pull the first medical gown 700b and advance the gown 700a in the roll or stack. Additionally, the second medical gown 750b may be separated from the first medical gown 700b as needed by tearing the sacrificial connectors 760a along the interface 730b.

The packaging assembly, including a stack or a roll, of the medical gowns may be used and advanced with respect a gown dispensing device, as shown in FIGS. 8A-8C. In FIG. 8A, a gown dispensing device 800 is shown. One such gown dispensing device is described in U.S. patent application Ser. No. 63/227,440, entitled "DONNING STATION FOR PERSONAL PROTECTIVE EQUIPMENT," which is incorporated by reference herein. In FIG. 8A, the gown dispensing device 800 is shown loaded with a roll 802 of medical gowns. The roll 802 may include a packaging of multiple medical gowns, arranged end-to-end, as shown in the examples above with respect to FIGS. 6-7B. The roll 802 may include an axial component 804 about which the medical gowns are arranged. The gown dispensing device 800 may include a support structure 812 and roll mount 814. The support structure 812 may be used to connect the gown dispensing device 800 to a wall or other structure in order to support a weight of the roll and various mechanism components of the device. The roll mount 814, in the example of FIG. 8A, may include a seat for the axial component 804 of the roll 802. The axial component 804 may be seated in the roll mount 814 and allow to rotate therein.

The gown dispensing device 800 is also shown as including a manipulation assembly 810. The manipulation assembly 810 may broadly include a collection of components of the gown dispensing device that are configured to facilitate the advancement of a medical gown form the roll 802 and manipulate the medical gown for an automated or substantially automated donning operation, described herein. In the example of FIG. 8A, the manipulation assembly 810 is shown including a rolling components 816. The rolling components 816 may include a pair of rollers through which a medical gown of the roll 802 is received. The rolling components 816 may operate, via an electromechanically assisted operation, to pull a medical gown from the roll 802. In this regard, and as shown in FIG. 8A, the medical gown 100 may be pulled from the roll 802 for suspension and manipulation by the gown dispensing device 800.

In FIG. 8B, the medical gown 100 is shown separated from the roll 802 and engagement on one or more manipulation features of the gown dispensing device 800. In one example, the gown dispensing device 800 may include a first manipulation feature 822a, a second manipulation feature 822b, a third manipulation feature 822c, and a fourth manipulation feature 822d. The first manipulation feature 822a may be movable relative to the support structure 812 via an engagement arm 818a. The fourth manipulation feature 822d may be movably relative to the support structure 812 via an engagement arm 8181b. The second and the third manipulation features 822b, 822c may generally be stationary relative to the support structure 812. In other cases, the second and third manipulation features 822b, 822c may be movable as well. In FIG. 8B, the medical gown 100 is shown separated from the roll 802 and suspended from one or more of the manipulation features 822a-822d via the plurality of tabs 180. As described herein, one or more of the manipulation feature 822a-822d may subsequently operate to manipulation the main body 110 of the medical gown 100 in order to facilitate donning.

Figure 11:
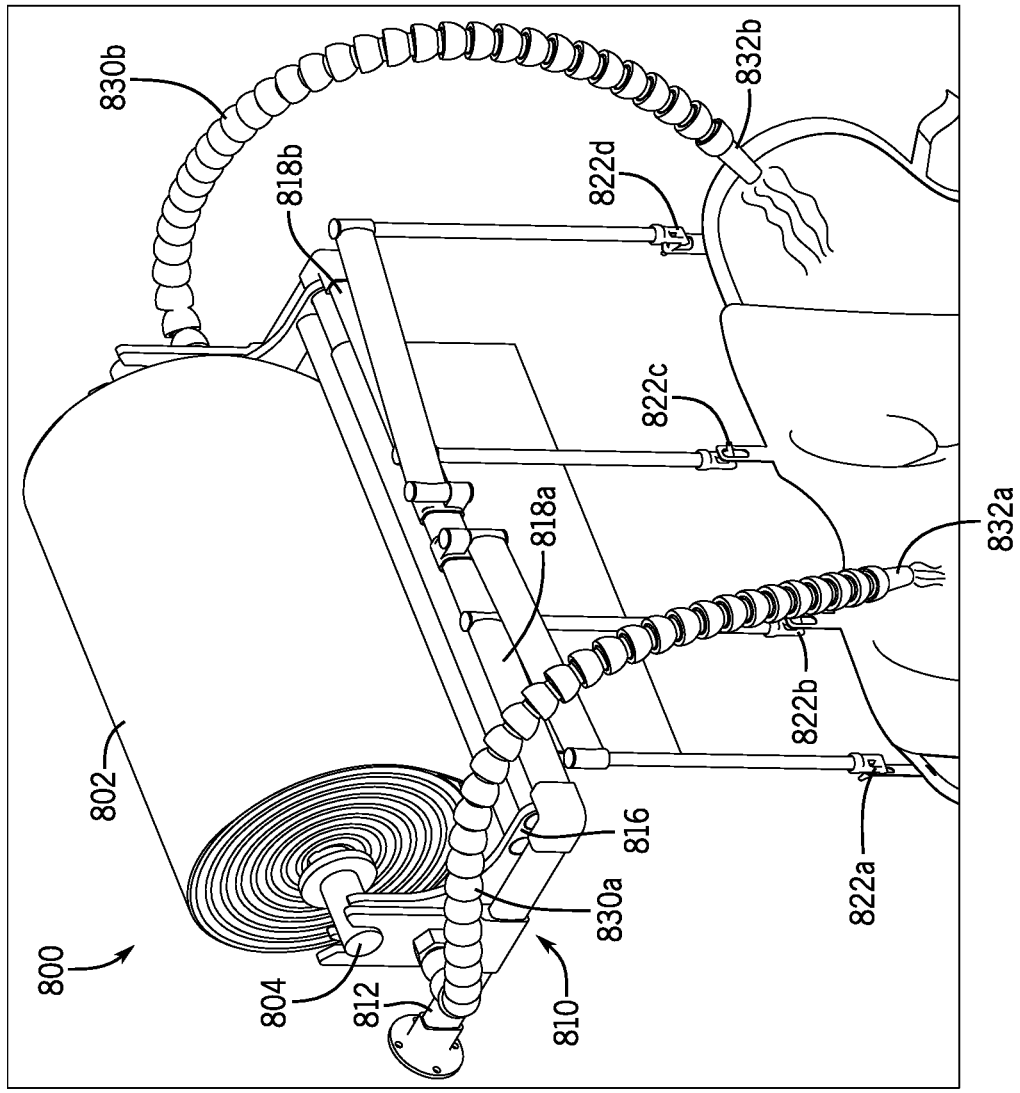
FIG. 11 depicts the gown donning system of FIG. 8A including an unfurling feature.

The medical gown 100 may initially be presented in the folded state in FIG. 8B. In FIG. 8C, the medical gown 100 is shown unfurled or unfolded, and ready for donning. In the unfurled state, each retention feature of the plurality of retention features 180 is engaged with a respective manipulation feature 822a-822d. In some cases, the material construction of the medical gown may make the medical gown clingy or otherwise difficult to unfurl. In this regard, and as shown in FIG. 11, the gown dispensing device 800 may include a first air hose 830a with a first air nozzle 832a, and a second air hose 830b with a second air nozzle 832b. The first and second air hoses 830a, 830b may be connected to fans, air pumps, an air supply, etc., such as a building's compressed air supply and/or other source. The hoses 830a, 830b may be manipulateable in order to direct the nozzles 832a, 832b toward the main body 110. On command, a burst of air may be delivered through one or both of the hoses 830a, 830b, which in turn may facilitate separating material layers or portions of main body 110.

Figure 12:
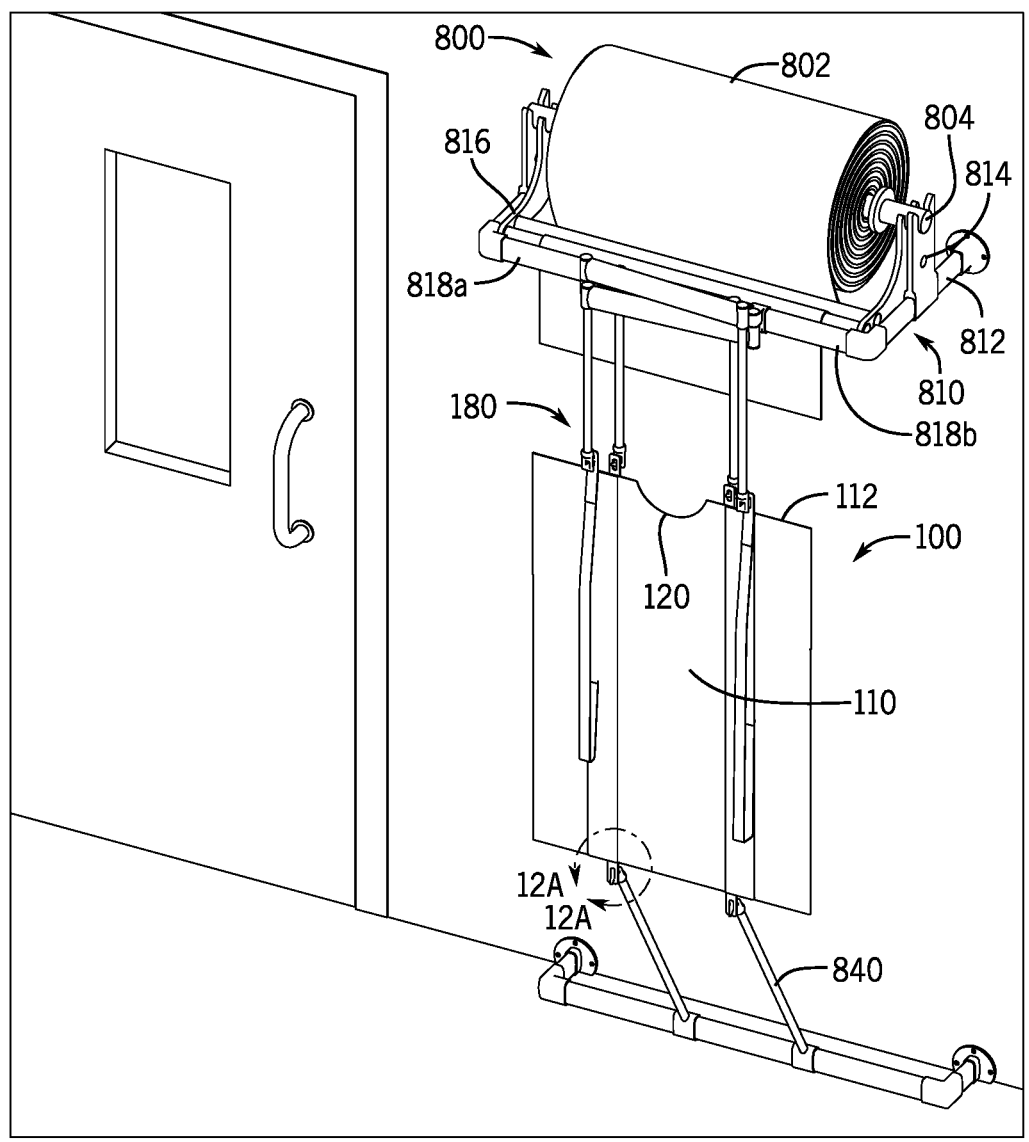
FIG. 12 depicts the gown donning system of FIG. 8A including terminal edge tabs.
Figure 12A:
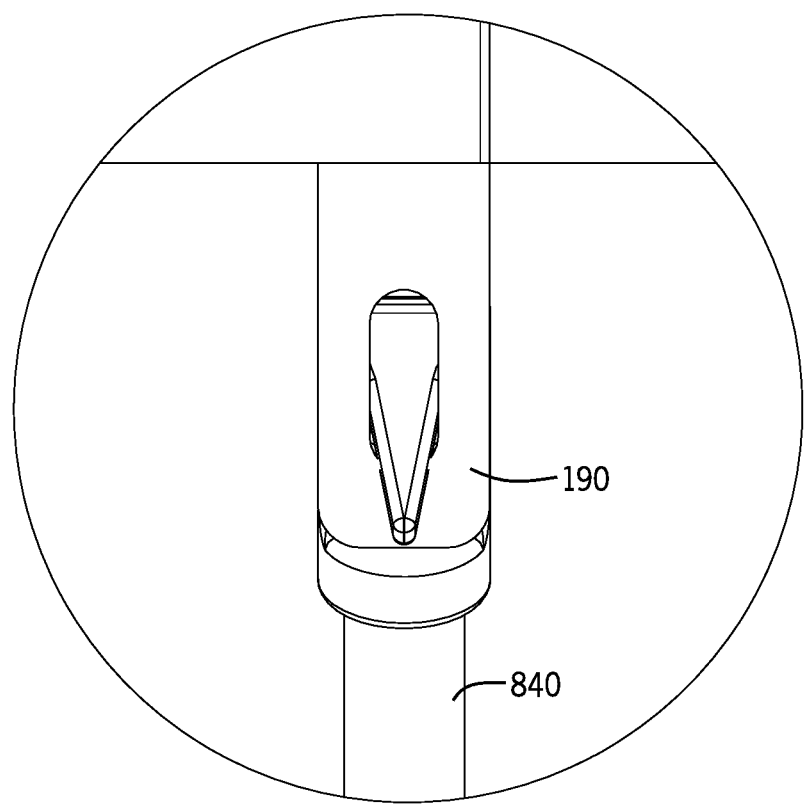
FIG. 12A depicts details 12A-12A of FIG. 12.

In some cases, it may be desirable to secure the terminal edge 118 of the medical gown 100 in the gown dispensing device 800. Securing the terminal edge 118, for example, may help anchor the medical gown during unfurling, for example, while receiving the burst of air. Additionally or alternatively, anchoring the terminal edge 118 may help provide additional support or firmness to the medical gown 100 during a donning process, for example, by making the main body 110 taught. In this regard, FIGS. 12 and 12A shows the gown dispensing device 800 including optional bottom anchors 840. The bottom anchors 840 may include elongated poles with hooks or other features at the end that are adapted to engage the terminal edge 118 of the medical gown 100. In some cases, as shown in the detail view of FIG. 12A, the medical gown 100 may include bottom tabs 190 that may be configured to receive the bottom anchor 840, and thereby anchoring the medical gown 100 with respect to the gown dispensing device 800.

Figure 21:
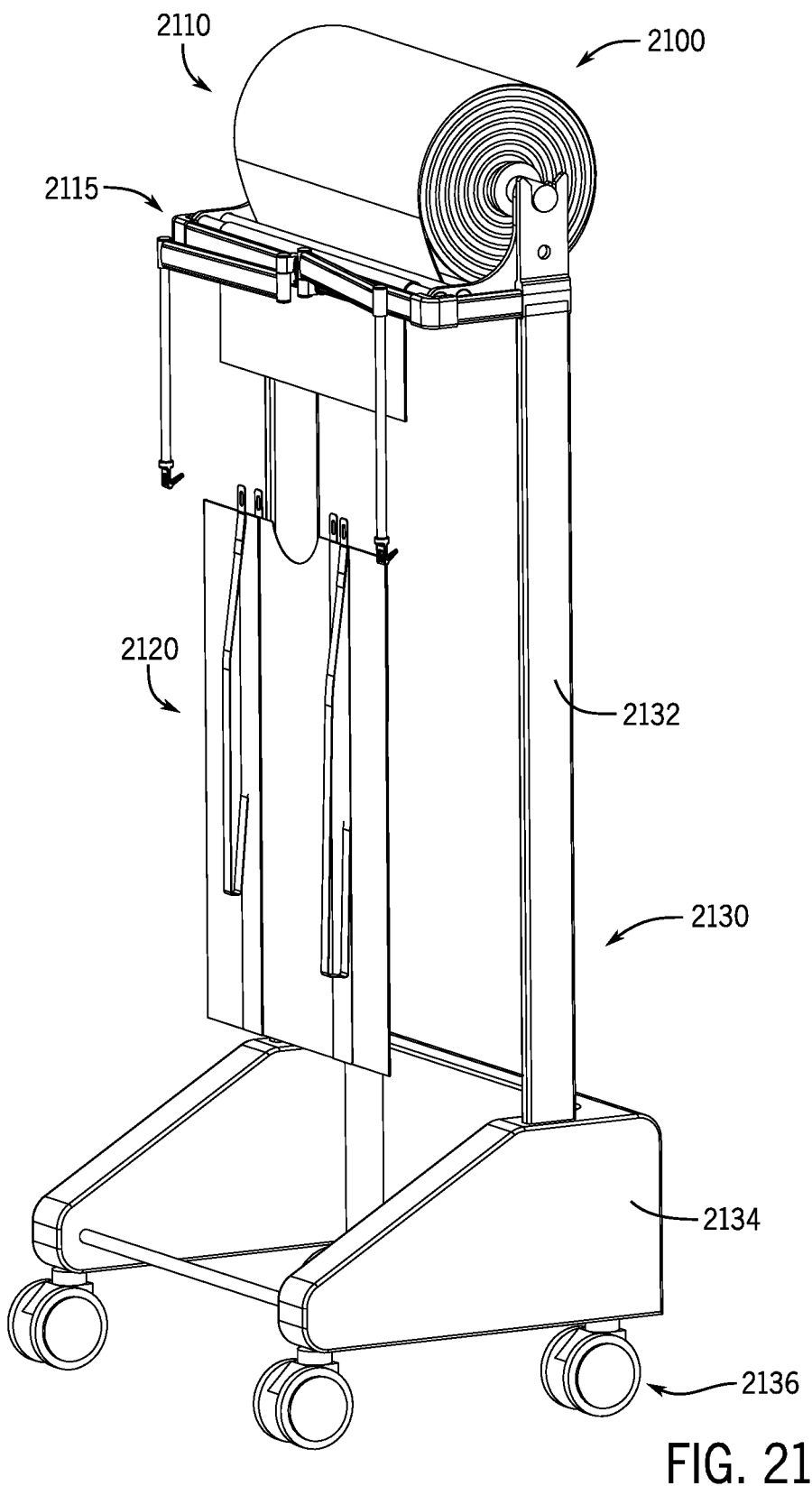
FIG. 21 depicts a mobile gown donning system.

The gown dispensing device 800 is shown for purposes of illustration as a wall-mounted system. In other examples, a mobile application is contemplated herein. For example, and with reference to FIG. 21, a mobile gown dispensing device 2100 is shown. The mobile gown dispensing device 2100 may be substantially analogous to the gown dispensing device 800 described above and include, among other components, a roll of medical gowns 2110, manipulation assembly 2115, and medical gown 2120; redundant explanation of which is omitted here for clarity. Notwithstanding the foregoing similarities, the mobile gown dispensing device 2100 is shown as including a mobile assembly 2130, including a support structure 2132, a base 2134, and wheels 2136. The wheels 2136 may be coupled to the base 2134 and permit movement of the base 2134, as needed. In some cases, the wheels 2136 may be selectively lockable to fix a position of the mobile gown dispensing device 2100 relative to a ground floor. The support structure 2132 may extend from the base 2134 and define a support or mount for the various components and systems described herein, including the roll 2110 and manipulation assembly 2115.

Figure 13A:
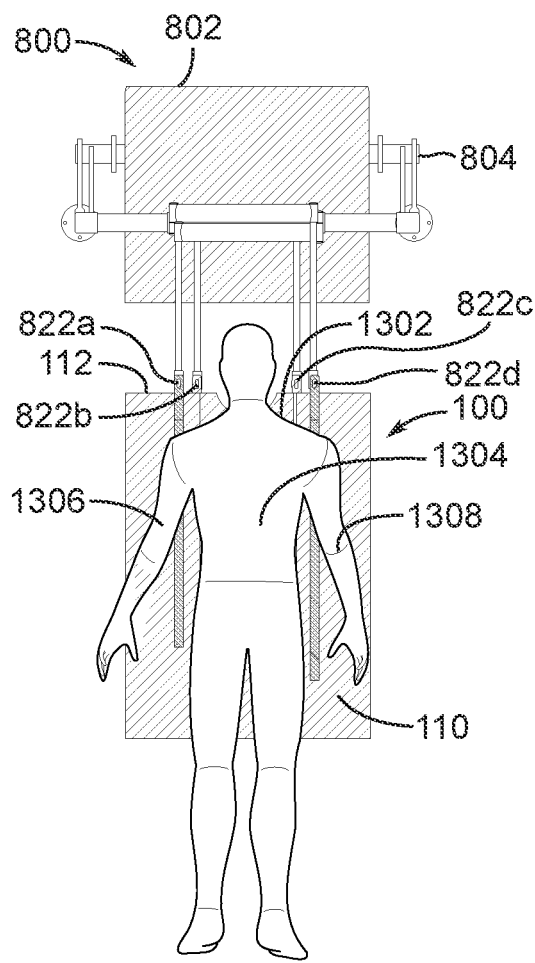
FIG. 13A depicts a rear view of an operation of donning a medical gown.
Figure 13B:
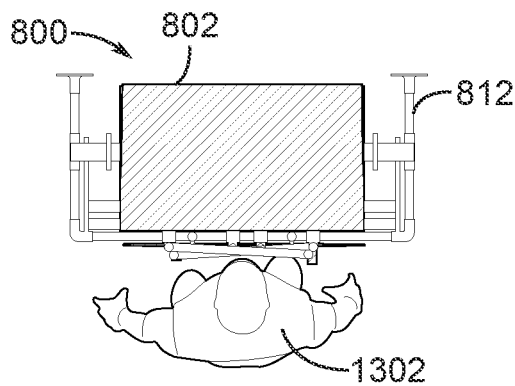
FIG. 13B depicts a top view of the operation of donning a medical gown of FIG. 13A.
Figure 22:
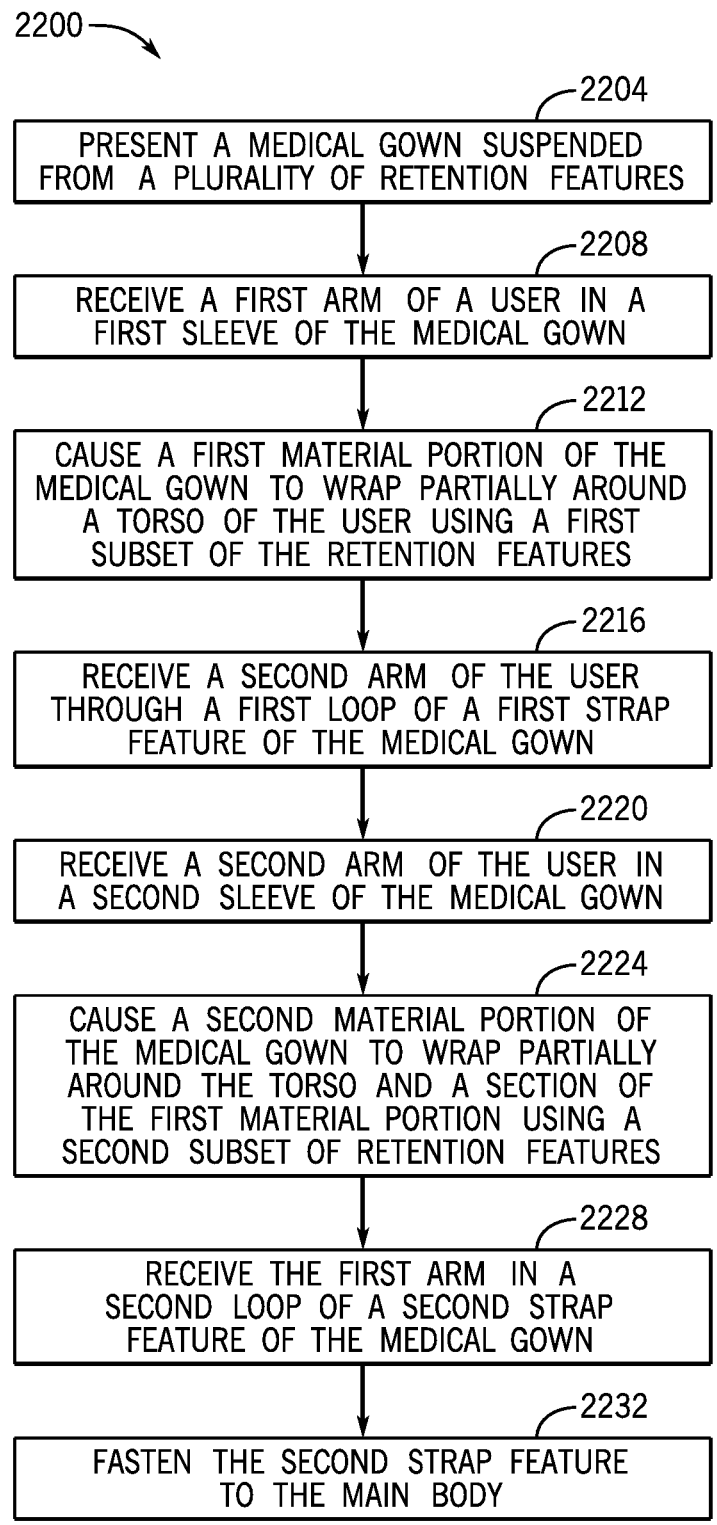
FIG. 22 depicts a flow diagram of a method of donning the medical gown.

In operation, the medical gown 100 may be used in an automated or substantially automated donning process. For example, the medical gown 100 may be used with the gown dispensing device 800, or other gown dispensing device, for automatically or substantially automatically donning the medical gown 100 on a user. With reference to the flow diagram of FIG. 22, a process 2200 is disclosed directing to donning the medical gown, such as donning the medical gown 100 in an automated or substantially automated process. It will be appreciated, however, that the medical gown 100, in other examples, may be donned free of assistance of the dispensing device and/or other system. For example, the medical gown 100 may be donned by a wearer separate from, or independent from, an operation of a dispensing device or automated or substantially automated system. With reference to the automated or substantially automated process 2200, at operation 2204, the medical gown 100 is presented suspended from a plurality of retention features. Steps for donning the disclosed gown are shown, schematically and step-wise, at FIGS. 13A-20B. Distances may not be drawn to scale. For example, and with reference to FIGS. 13A and 13B, the medical gown 100 is shown suspended from the gown dispensing device 800 and, the plurality of retention features 180 may be engaged with corresponding manipulation features of the manipulation features 822a-822d. The medical gown 100 is shown in FIGS. 13A and 13B suspended from the gown dispensing device 800 and presented at a front side of a user 1302. For purposes of illustration, the user 1300 is shown in FIGS. 13A and 13B as including a torso 1304, a first arm 1306 (e.g., a left arm) and a second arm 1308 (e.g., a right arm), at a distance from the gown dispensing device 800. The distance from user to device may not be to scale.

Figure 14B:
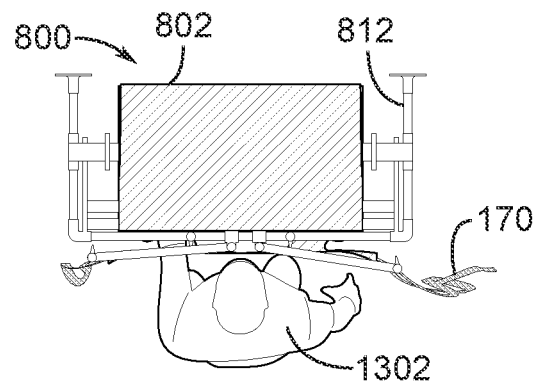
FIG. 14B depicts a top view of the operation of donning a medical gown of FIG. 14A.

Subsequently or in combination with the operation 2204, the medical gown 100 may be unfurled, as described herein. The medical gown 100 may be unfurled or unfolded with a burst of air from the air hoses 830a, 830b. Additionally or alternatively, the medical gown 100 may be unfurled manually, such as by a user. Next, at operation 2208, the first arm 1306 of the user 1302 is received in the first arm feature 126a of the medical gown 100, as shown in FIGS. 14A and 14B. For example, the user 1302 may insert the first arm 1306 fully partially within the first arm feature 126a such that the first arm 1306 is within the first sleeve 129a. With the first arm 1306 of the user 1302 within the first arm feature 126a, at operation 2212, the first material portion 130a of the medical gown 100 may be caused to wrap partially around the torso 1304 of the user 1302 using a first subset of the plurality of retention features 180. For example, and as shown in FIGS. 15A and 15B, the first manipulation feature 822a may operate to move first material portion 130a using the first retention feature 180a. In some cases, the first manipulation feature 822a may be engaged with the first retention feature 180a and may proceed in an arcuate path about a first side of the user 1302. The first retention feature 180a may be attached to the first strap feature 140, which is in turn attached to the first material portion 130a. In this regard, movement of the first manipulation feature 822a may cause the first retention feature 180a, the first strap feature 140, and the first material portion 130a to move, correspondingly, and wrap partially about the torso 1304.

The first manipulation feature 180a may continue moving about the torso 1304 until the first strap feature 140 presents at or adjacent to the second arm 1308. Subsequently, at operation 2216, and as shown in FIGS. 16A and 16B, the second arm 1308 of the user 1302 is received through the first loop 142 of the first strap feature 140. The first strap feature 140 may include the elastic component 150. In this regard, the first strap feature 140 may be flexible and expandable in order to accommodate a shape of the user 1300 and facilitate the receipt of the second arm 1308 into the first loop. Then, when the second arm 1308 is received through the first loop 142, the elastic component 150 may be allowed to contract and cause the first strap feature 140 to substantially conform to the user 1302. In other cases, the elastic component 150 may be omitted and/or the first strap feature 140 may be secured via another manner, including uses fasteners of various types.

The method of donning may proceed with operation 2220, and as shown in FIGS. 17A and 17B, in which the second arm 1308 of the user 1302 is received in the second arm feature 126b of the medical gown 100. For example, the user 1302 may insert the second arm 1306 fully or partially within the second arm feature 126b such that the second arm 1308 is within the second sleeve 129b. With the second arm 1308 of the user 1302 within the second arm feature 126b, at operation 2224, the second material portion 130b of the medical gown 100 may be caused to wrap partially around the torso 1304 of the user 1302 using a second subset of the plurality of retention features 180. For example, and as shown in FIGS. 18A and 18B, the fourth manipulation feature 822d may operate to move the second material portion 130b using the fourth retention feature 180d. In some cases, the fourth manipulation feature 822b may be engaged with the fourth retention feature 180d and may proceed in an arcuate path about a second side of the user 1302. The fourth retention feature 180b may be attached to the second strap feature 160, which is in turn attached to the second material portion 130b. In this regard, movement of the fourth manipulation feature 822d may cause the fourth retention feature 180d, the second strap feature 160, and the second material portion 130b to move, correspondingly, and wrap partially about the torso 1304.

Figure 19A:
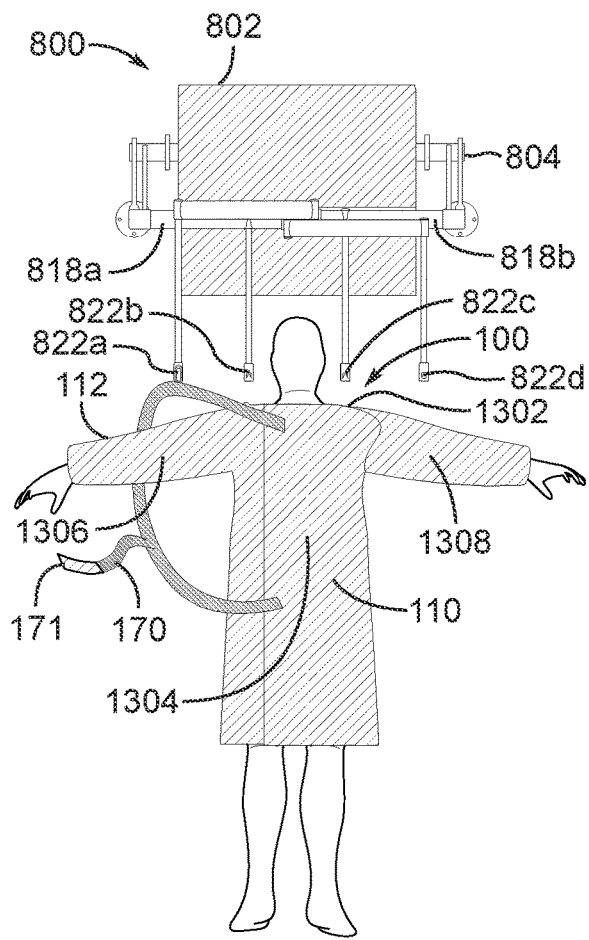
FIG. 19A depicts a rear view of another operation of donning a medical gown.
Figure 19B:
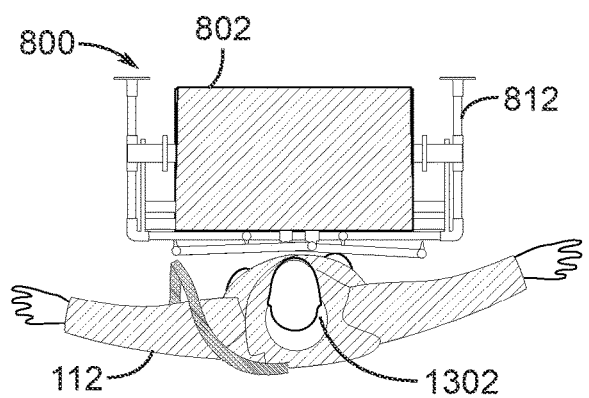
FIG. 19B depicts a top view of the operation of donning a medical gown of FIG. 19A.

At operation 2228, the first arm 1306 of the user 1302 is received through the second loop 162 of the medical gown 100. For example, and as shown in FIGS. 19A and 19B, the fourth manipulation feature 180d may continue moving about the torso 1304 until the second strap feature 160 presents at or adjacent to the first arm 1306. This may allow the user to insert the first arm 1306 into the first loop 142.

Figure 20A:
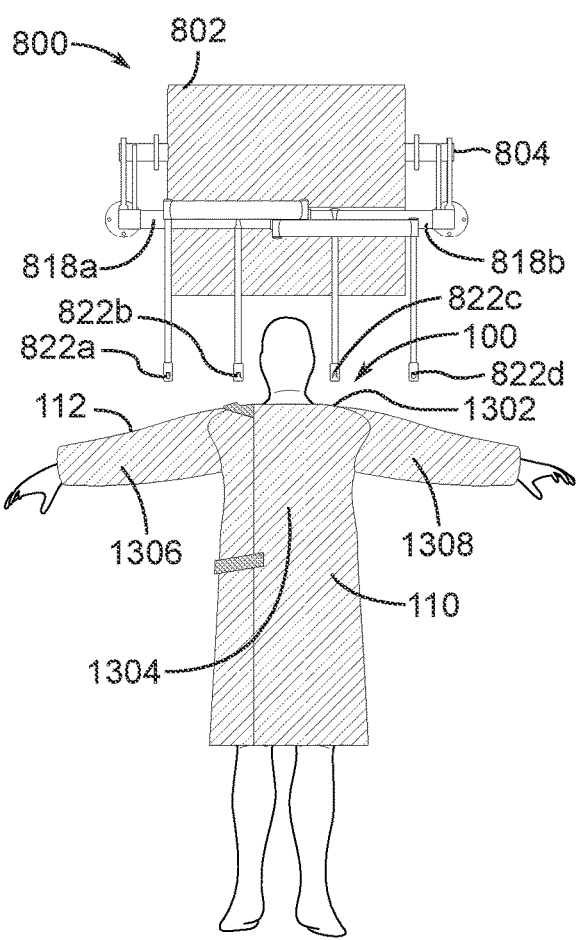
FIG. 20A depicts a rear view of another operation of donning a medical gown.
Figure 20B:
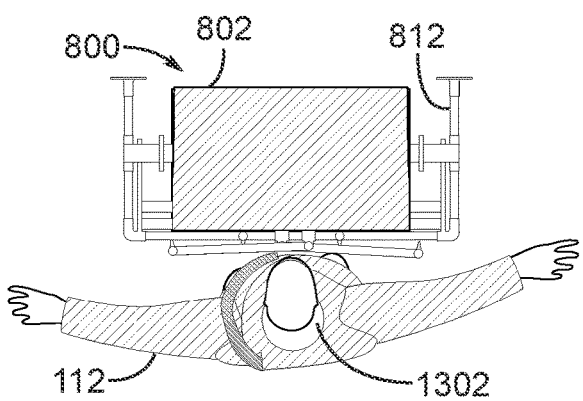
FIG. 20B depicts a top view of the operation of donning a medical gown of FIG. 20A.

With the first arm 1306 in the first loop 142, the fastening end 170 may present at or near a front side of the user 1302. The user 1302 may proceed at operation 2232, and as shown in FIGS. 20A and 20B, to secure the fastening feature 171 of the fastening end 170 to the main body 110 or other portion of the medical gown 100 for a snug fit, as desired.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A method of donning a medical gown comprising
presenting the medical gown suspended from a plurality of retention features disposed along a neck edge of the medical gown, the neck edge defined by a main body of the medical gown, the neck edge comprises a neck feature that is interposed between a first subset of retention features of the plurality of retention features and a second subset of the plurality of retention features,
the main body comprises a first material portion and a second material portion,
the medical gown further comprises a first arm feature and a second arm feature,
the first arm feature and the second arm feature extend from the main body and define respective first and second sleeves for arms of the user,
a first strap feature coupled with the main body and defining a first loop with a first side edge of the main body, and
a second strap feature coupled with the main body and defining a second loop with a second side edge of the main body,
receiving a first arm of the user in the first sleeve,
causing the first material portion to wrap partially around the torso using a first subset of the retention features,
subsequent to the receiving of the first arm of the user in the first sleeve, receiving a second arm through the first loop and securing the first material portion relative to the user,
receiving the second arm of the user in the second sleeve,
causing the second material portion to wrap partially around the torso and a section of the first material portion using the second subset of retention features,
subsequent to the receiving of the second arm of the user in the second sleeve, receiving the first arm through the second loop.

2. The method of claim 1, further comprising causing the medical gown to become unfurled using one or both of a mechanical input force or a fluidic input force.

3. The method of claim 2, wherein the fluidic input force is provided by a burst of air delivered by a gown dispensing device.

4. The method of claim 1, wherein
the plurality of retention features comprises a plurality of tabs having an aperture extending therethrough, and
the presenting further comprises hanging the plurality of tabs on respective ones of a corresponding plurality of manipulation features of a gown dispensing device.

5. The method of claim 1, further comprising, subsequent to causing the second material portion to wrap partially around the torso, securing the second strap feature to the main body.

6. A method of donning a medical gown comprising
presenting, to a user, the medical gown suspended from a plurality of retention features disposed along a neck edge of the medical gown, the neck edge defined by a main body of the medical gown, the medical gown further comprising:
a first arm feature and a second arm feature, the first arm feature and the second arm feature extend from the main body and define respective first and second sleeves for arms of the user,
a first strap feature coupled with the main body and defining a first loop with a first side edge of the main body,
a second strap feature coupled with the main body and defining a second loop with a second side edge of the main body; and
the method further comprising:
manipulating the main body via the plurality of retention features to partially open the medical gown;
presenting the first sleeve to the user;
receiving a first arm of the user in the first sleeve;
wrapping a first material portion of the medical gown at least partially around a torso of the user using a first subset of the plurality of retention features;
subsequent to the receiving of the first arm of the user in the first sleeve, receiving a second arm through the first loop and securing the first material portion relative to the user,
receiving the second arm of the user in the second sleeve,
wrapping a second material portion of the medical gown at least partially around the torso and a section of the first material portion using a second subset of the plurality of retention features,
receiving the first arm through the second loop.

7. The method of claim 6, wherein the first strap feature includes an elastic component.

8. The method of claim 7, wherein the first strap feature comprises at least one fastener for securing the first strap around the torso of the user.

9. The method of claim 6, further comprising, after wrapping the second material portion
presenting the second loop, to the user for receiving the second arm of the user.

10. The method of claim 9, wherein the second strap feature comprises at least one fastening feature.

11. The method of claim 10, wherein the fastening feature of the second strap feature is an adhesive.

* * * * *